US012759610B2

(12) United States Patent
Horst et al.

(10) Patent No.: US 12,759,610 B2
(45) Date of Patent: Oct. 13, 2026

(54) CHILD CARRIAGE WITH REMOVABLE SOFT GOODS

(71) Applicant: WONDERLAND SWITZERLAND AG, Steinhausen (CH)

(72) Inventors: Andrew J. Horst, Morgantown, PA (US); Curtis M. Hartenstine, Birdsboro, PA (US)

(73) Assignee: Wonderland Switzerland AG, Steinhausen (CH)

( * ) Notice: Subject to any disclaimer, the term of this patent is extended or adjusted under 35 U.S.C. 154(b) by 339 days.

(21) Appl. No.: 18/560,138

(22) PCT Filed: May 11, 2022

(86) PCT No.: PCT/US2022/028729
§ 371 (c)(1),
(2) Date: Nov. 10, 2023

(87) PCT Pub. No.: WO2022/240962
PCT Pub. Date: Nov. 17, 2022

(65) Prior Publication Data

US 2024/0278820 A1 Aug. 22, 2024

Related U.S. Application Data

(60) Provisional application No. 63/237,431, filed on Aug. 26, 2021, provisional application No. 63/188,163, filed on May 13, 2021.

(51) Int. Cl.
*B62B 9/12* (2006.01)
*B62B 7/14* (2006.01)
(Continued)

(52) U.S. Cl.
CPC .................. *B62B 9/12* (2013.01); *B62B 7/14* (2013.01); *B62B 9/142* (2013.01); *B62B 9/20* (2013.01); *B62B 9/26* (2013.01)

(58) Field of Classification Search
CPC .. B62B 9/12; B62B 9/142; B62B 9/20; B62B 9/26; B62B 9/14; B62B 9/24
See application file for complete search history.

(56) References Cited

U.S. PATENT DOCUMENTS 4,369,986 A * 1/1983 de la Fe .................... B62B 7/08
403/100
4,824,168 A 4/1989 Makoski
(Continued)

FOREIGN PATENT DOCUMENTS

CA 2304410 A1 4/2001
CN 101855119 A 10/2010
(Continued)

OTHER PUBLICATIONS

EPO Communication pursuant to Rule 164(1) EPC for corresponding European Application No. 22808250.9 dated Mar. 10, 2025, 14 pages long.
(Continued)

*Primary Examiner* — Steve Clemmons
(74) *Attorney, Agent, or Firm* — Volpe Koenig

(57) ABSTRACT

A child carriage including a carriage frame to support a removable child seat above a riding surface, the carriage frame having a lower frame portion comprising at least one front leg, a first rear leg, and a second rear leg. The carriage includes a soft goods seat assembly is provided to removably couple to the frame, wherein the soft goods seat assembly includes a soft goods seat having a seatback and a seat pan that extends from the seatback at a seat bight, and a first leg coupler and a second leg coupler disposed at first and second sides of the soft goods seat, respectively, to removably attach to the first and second rear legs, respectively, so as to couple the seat bight to the first and second rear legs and such that the first and second leg couplers are
(Continued)

positionally fixed relative to the first and second rear legs, respectively.

22 Claims, 22 Drawing Sheets

(51) Int. Cl.

| | |
|---|---|
| ***B62B 9/14*** | (2006.01) |
| ***B62B 9/20*** | (2006.01) |
| ***B62B 9/26*** | (2006.01) |

(56) References Cited

U.S. PATENT DOCUMENTS

| | | | | |
|---|---|---|---|---|
| 5,056,533 | A * | 10/1991 | Solano | A61G 7/1023 5/655 |
| 5,662,380 | A * | 9/1997 | Tam | B62B 9/102 297/440.11 |
| 5,947,555 | A | 9/1999 | Welsh, Jr. et al. | |
| 7,163,228 | B2 * | 1/2007 | Faber | B62B 7/06 280/654 |
| 7,938,433 | B2 * | 5/2011 | Pike | B62B 7/105 280/47.38 |
| 8,152,182 | B2 | 4/2012 | Vickers et al. | |
| 9,956,980 | B2 | 5/2018 | Nygren et al. | |
| 2001/0013689 | A1 | 8/2001 | Cone, II et al. | |
| 2014/0091559 | A1 | 4/2014 | Tran | |
| 2015/0217793 | A1 | 8/2015 | Alf et al. | |
| 2016/0128491 | A1 | 5/2016 | Martiniuk et al. | |
| 2021/0129887 | A1 | 5/2021 | Walker | |

FOREIGN PATENT DOCUMENTS

| | | | | |
|---|---|---|---|---|
| DE | 202017003806 | U1 * | 10/2018 | B62B 9/102 |
| EP | 1918155 | B1 | 5/2012 | |
| GB | 1176517 | A | 1/1970 | |
| GB | 2470126 | A * | 11/2010 | B62B 9/14 |
| GB | 2476743 | A | 7/2011 | |
| GB | 2493223 | A | 1/2013 | |
| IL | 97003 | A | 7/1994 | |
| JP | S58158764 | A | 9/1983 | |
| JP | 2001151119 | A | 6/2001 | |
| JP | 2008162561 | A * | 7/2008 | |
| JP | 2012096625 | A | 5/2012 | |
| TW | M479255 | U | 6/2014 | |

OTHER PUBLICATIONS

First Office Action for corresponding Taiwan Application No. 113127212 dated Apr. 29, 2025, 8 pages long.

Extended European Search Report for corresponding European Application No. 22808250.9 dated Jul. 9, 2025, 18 pages.

Notice of Reasons for Rejection for corresponding Japanese Application No. 2023-570010 dated Aug. 5, 2025, 5 pages.

International Search Report and Written Opinion for Application No. PCT/US2022/028729 dated Oct. 7, 2022.

Office Action issued in corresponding Taiwanese Application No. 111117668 dated Sep. 13, 2023. English translation provided.

Notice of Allowance for corresponding Japanese Application No. 2023-570010 dated Dec. 25, 2025, 6 pages.

* cited by examiner

CHILD CARRIAGE WITH REMOVABLE SOFT GOODS

CROSS-REFERENCE TO RELATED APPLICATIONS

The present application is a 371 National Stage of International Patent Application No. PCT/US2022/028729, filed on May 11, 2022, which claims the benefit of U.S. Provisional Application 63/188,163, filed on May 13, 2021, and U.S. Provisional Application 63/237,431, filed on Aug. 26, 2021, the contents of which are herein incorporated by reference in their entireties as if fully set forth.

FIELD OF THE INVENTION

The present disclosure relates generally to wheeled carriages for transporting children, and more specifically to a system and method of attaching a soft goods seat to a child carriage.

BACKGROUND

Child travel systems commonly include an infant car seat (also referred to as an infant carrier) and a carriage (also referred to as a stroller). The carriage typically includes a frame, a child armrest that is coupled to the frame, and a toddler soft goods seat coupled to the frame. The carriage can be configured to be used in an infant mode in which the carriage supports the infant car seat. For example, one end of the infant car seat may be supported by the frame and the other end of the infant car seat may be supported by the armrest. Commonly, the toddler soft goods seat stays attached to the carriage frame while the carriage is in the infant mode. The carriage can also be configured to be used in toddler mode, without the infant car seat, where the child sits directly in the soft goods seat.

Typically, in a travel system such as that discussed above, the soft goods seat is unnecessary when the infant car seat is being used with the carriage in the infant mode. In the infant mode, the soft goods seat may at least partially obstruct a view of the child in the infant car seat and may add unnecessary bulk and weight to the carriage. Therefore, it would be beneficial if the soft goods seat could be easily removable from the carriage in the infant mode, while still having sufficient structural integrity to support a child in the toddler mode while the toddler soft goods seat is attached to the frame.

While conventional carriages and travel systems have generally been considered satisfactory for their intended purpose, there is still a need in the art for improved carriages and travel systems that are less bulky and easier to use. The present disclosure provides a solution for this need.

The present invention relates to a travel system carriage having a removable soft goods seat, and in particular, to various features for removably coupling the soft goods seat to the carriage frame.

SUMMARY OF THE INVENTION

A child carriage is disclosed. The child carriage includes a carriage frame to support a removable child seat above a riding surface, the carriage frame having a lower frame portion comprising at least one front leg, a first rear leg, and a second rear leg. The child carriage also includes a soft goods seat assembly that is configured to removably couple to the frame, the soft goods seat assembly including a soft goods seat having a seatback and a seat pan that extends from the seatback at a seat bight, and a first leg coupler and a second leg coupler disposed at first and second sides of the soft goods seat, respectively, and configured to removably attach to the first and second rear legs, respectively, so as to couple the seat bight to the first and second rear legs and such that the first and second leg couplers are positionally fixed relative to the first and second rear legs, respectively.

It is also considered that a carriage frame includes a lower frame portion having a plurality of legs, at least one frame coupler having a first portion and a second portion that are spaced from one another to define a space therebetween, and a soft goods seat assembly that is configured to removably couple to the frame. The soft goods seat assembly includes a soft goods seat having a seatback and a seat pan that extends from the seatback, and at least one seat coupler configured to removably couple to the at least one frame coupler of the carriage frame, the at least one seat coupler being at least partially positioned in the space between the first and second portions. The first portion can include one of a protrusion and an opening that is configured to engage another of a protrusion and an opening of the at least one seat coupler of the soft goods seat assembly, and the second portion comprises one of a protrusion and an opening that is configured to engage another of a protrusion and an opening of the at least one seat coupler of the soft goods seat assembly.

It also considered that a child carriage includes a carriage frame configured to support a removable soft goods seat assembly above a riding surface, the carriage frame having, a lower frame portion comprising a plurality of legs, and a handle having a first handle portion and a second handle portion that extend away from the lower frame portion and that are spaced from one another so as to define a space therebetween. The child carriage also includes a soft goods seat assembly that is configured to removably couple to the frame, and fit within the defined space, the soft goods seat assembly including a soft goods seat having a seatback, a seat pan that extends forward from the seatback, and first and second sidewalls that extend forward from the seatback, an upper coupler configured to removably couple the first sidewall to the first handle portion, and a lower coupler configured to configured to removably couple the first sidewall to the first handle portion. The child carriage is configured such that the first sidewall can be attached to the first handle portion by coupling the upper handle coupler to the first handle portion and then coupling the lower coupler to the first handle portion.

It is also considered that a child carriage includes a carriage frame configured to support a removable soft goods seat assembly above a riding surface, the carriage frame having a lower frame portion comprising a plurality of legs, and a handle having a first handle portion and a second handle portion that extend upwards from the lower frame portion and that are spaced from one another so as to define a space therebetween for the soft goods seat assembly. The soft goods seat assembly that is configured to removably couple to the frame, includes a soft goods seat having a seatback, a seat pan that extends forward from the seatback, and first and second sidewalls that extend forward from the seatback, a canopy having a bow; and a coupler that is configured to couple both the first sidewall and the bow to the first handle portion.

It is also considered that a child carriage includes a carriage frame having a first side and a second side spaced from one another along a lateral direction so as to define a space therebetween, a pair of rear legs spaced from one another along the lateral direction, and at least one front leg, at least one fold latch configured to transition between a latched position in which the carriage frame is prevented from folding, and an unlatched position in which the carriage frame is permitted to fold. The carriage also includes a fold actuator having an first actuator strap that is operatively coupled to the at least one fold latch such that movement of the actuator strap causes the at least one fold latch to transition to the unlatched position and a crosspiece extending between the first and second sides, where the actuator strap can extend between the first and second sides and at least a portion of the actuator strap extends below or within the crosspiece as the actuator strap extends between the first and second sides.

A method of assembling a child carriage is also disclosed. The method includes coupling a first upper coupler of a first soft goods seat assembly sidewall to a first coupler of an upper handle portion of a carriage frame, coupling a second upper coupler of a second soft goods seat assembly sidewall to a second coupler of the upper handle portion of the carriage frame, coupling a first lower coupler of the first soft goods seat assembly sidewall to a first coupler of an lower handle portion of the carriage frame, and coupling a second lower coupler of the second soft goods seat assembly sidewall to a second coupler of the lower handle portion of the carriage frame.

It is also considered that a child carriage includes a carriage frame having a first side and a second side spaced from one another along a lateral direction so as to define a space therebetween, a lower frame portion having a pair of rear legs spaced from one another along the lateral direction, and at least one front leg, a handle that extends upwards from the lower frame portion and at least one fold latch configured to transition between a latched position in which the carriage frame is prevented from folding, and an unlatched position in which the carriage frame is permitted to fold. The carriage frame also includes a fold actuator having a first actuator strap that is operatively coupled to the at least one fold latch such that movement of the first strap causes the at least one fold latch to transition to the unlatched position. A soft goods seat configured to attach to the carriage frame between the first and second sides is also included. The soft goods seat includes a seatback, and a seat pan that extends from the seatback at a seat bight, and a second actuator strap, and a coupler configured to couple the first actuator strap and the second actuator strap to one another such that movement of the first actuator strap causes a movement of the second actuator strap to transition the at least one fold latch to the unlatched position.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION OF THE PREFERRED EMBODIMENTS

Figure 1:
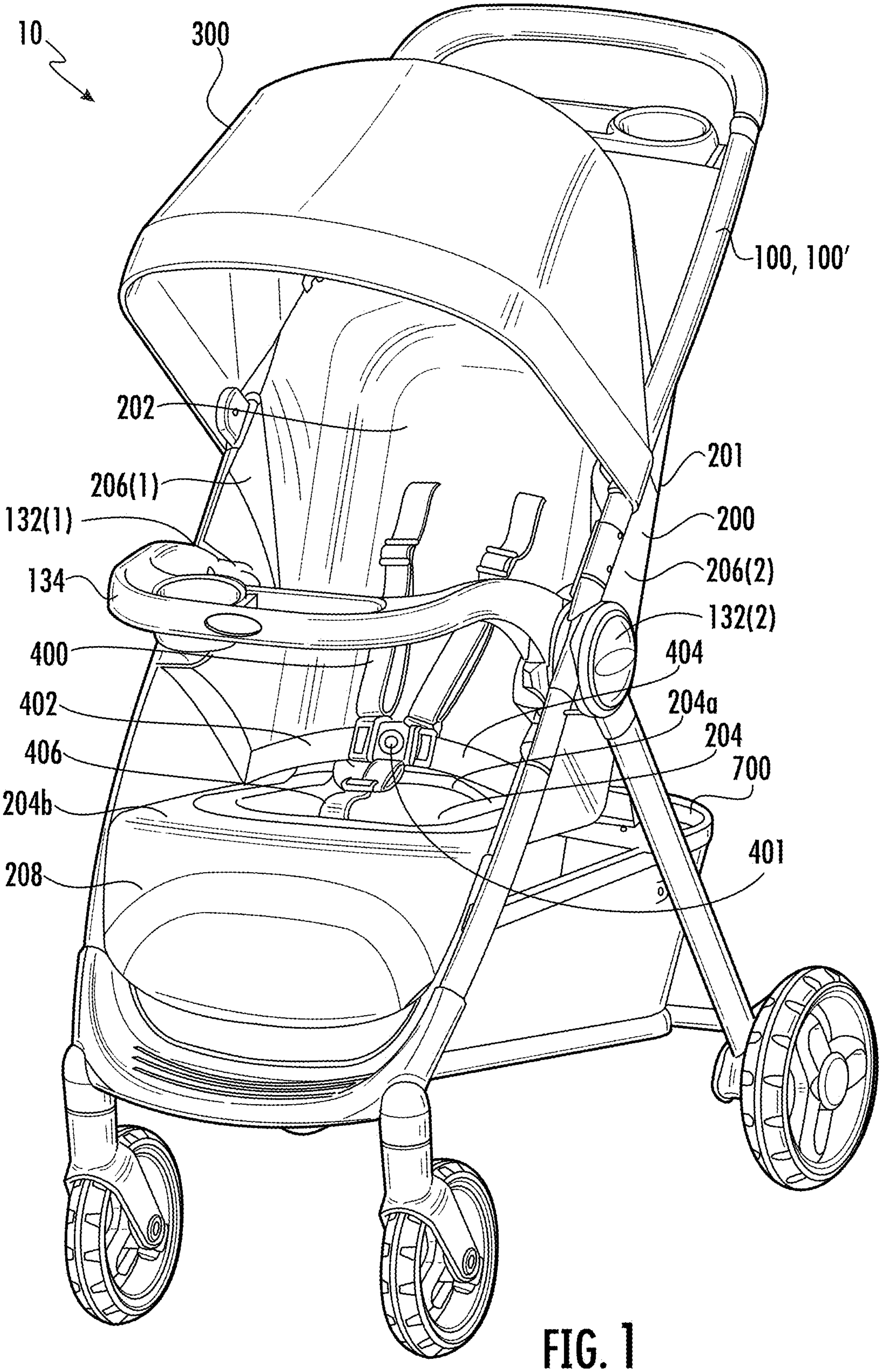
FIG. 1 shows a perspective view of a child carriage according to one example, the child carriage having a carriage frame and a removable soft goods seat assembly.

Reference will now be made to the drawings wherein like reference numerals identify similar structural features or aspects of the subject disclosure. For purposes of explanation and illustration, and not limitation, a view of an exemplary embodiment of carriage in accordance with the disclosure is shown in FIG. 1 and is designated generally by reference character 10. Other embodiments of the carriage in accordance with the disclosure, or aspects thereof, are provided in FIGS. 2-39, as will be described.

Figure 3:
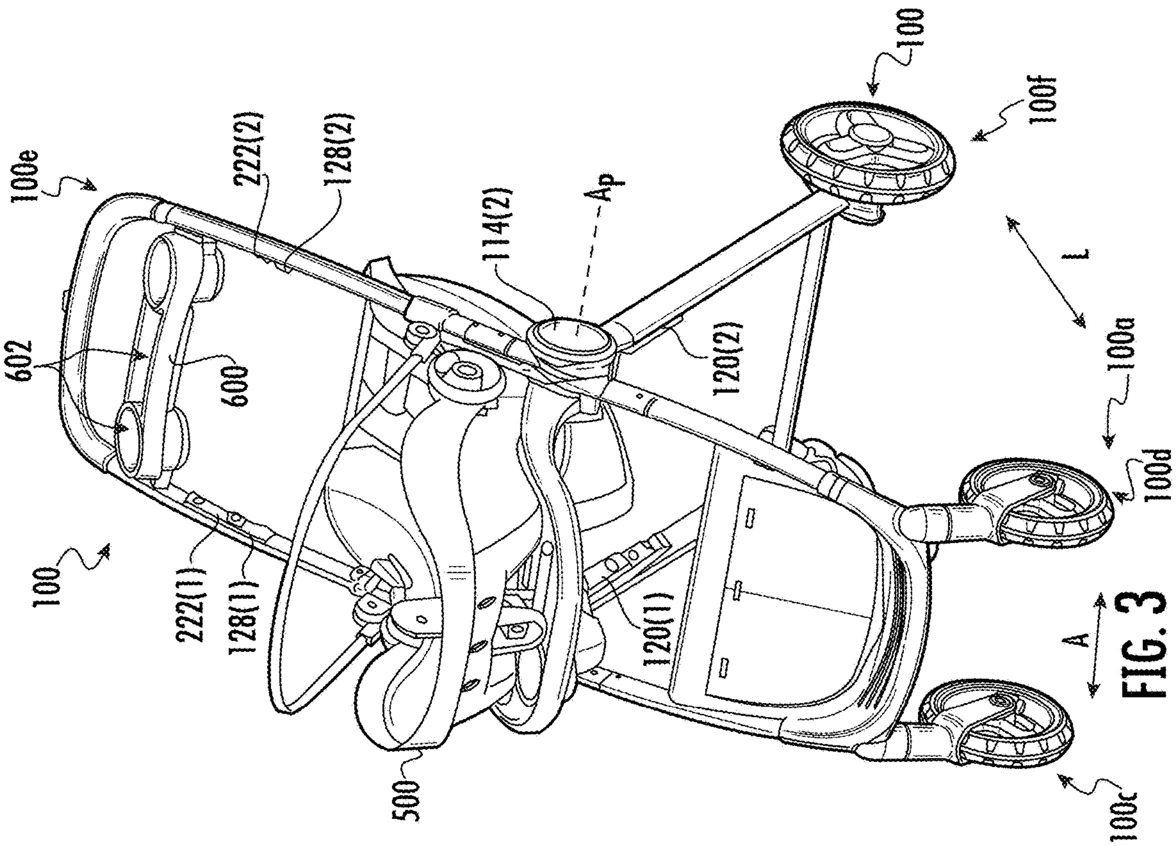
FIG. 3 shows a perspective view of the carriage frame of FIG. 2 with an infant car seat attached thereto.
Figure 2:
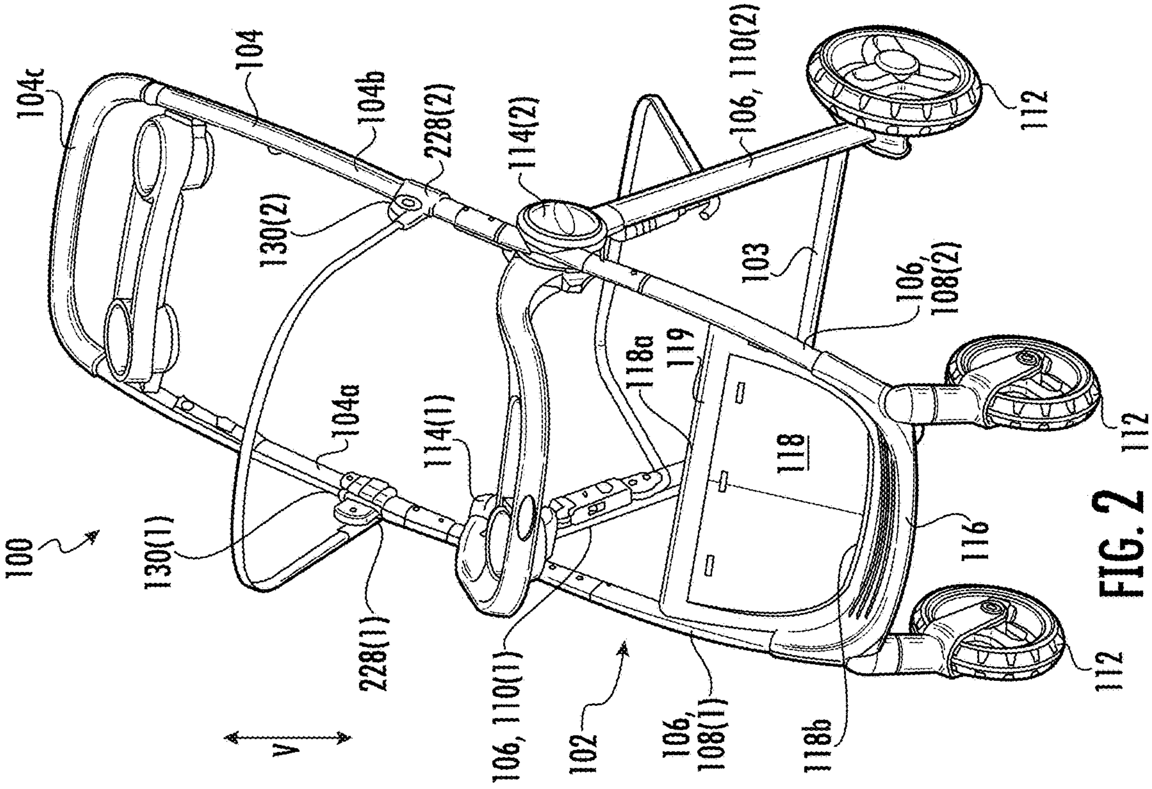
FIG. 2 shows a perspective view of the carriage frame of the child carriage of FIG. 1 according to one example with the soft goods seat assembly removed.
Figure 24:
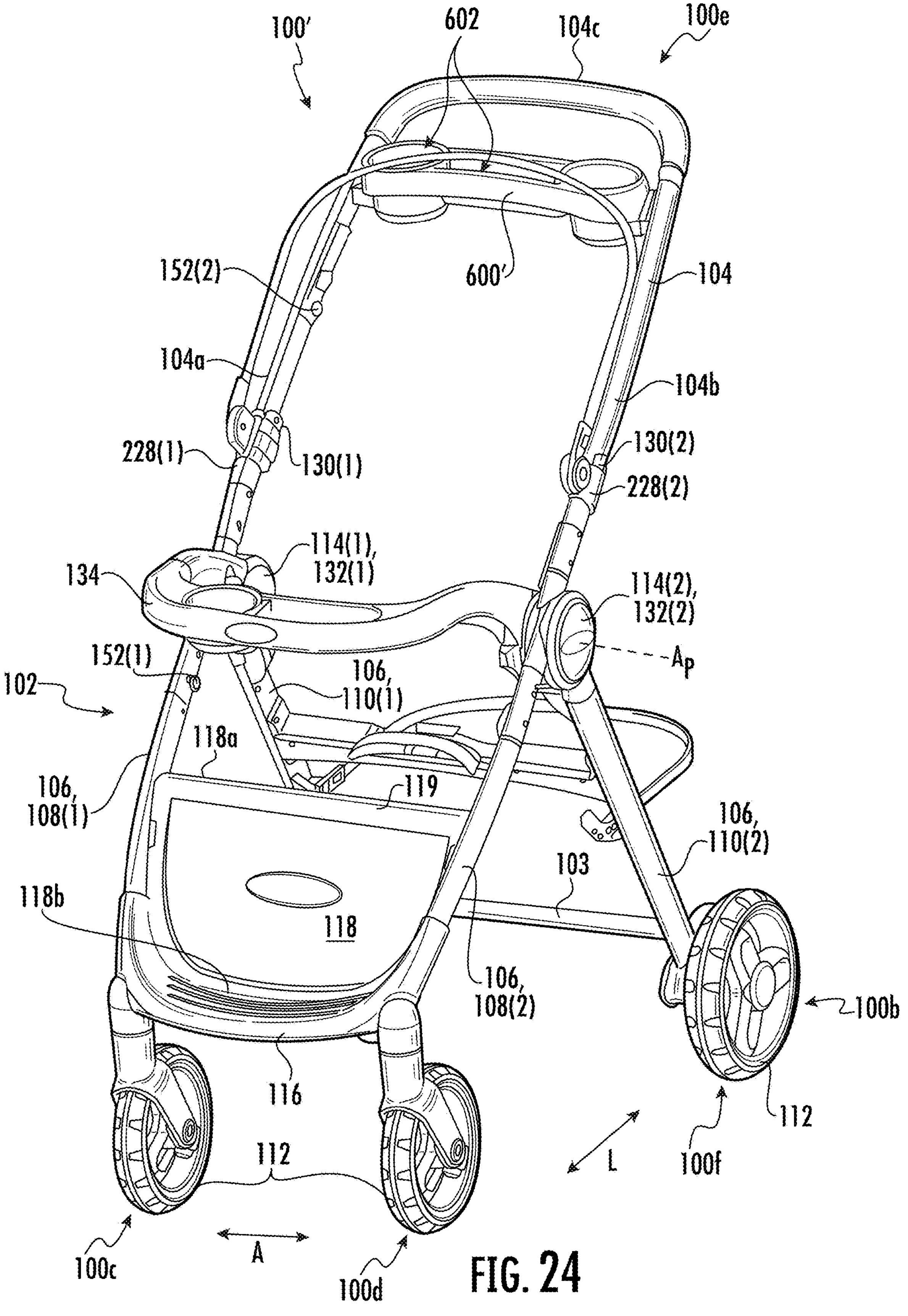
FIG. 24 shows a perspective view of the carriage frame of the child carriage of FIG. 1 according to a second example, with the soft goods seat assembly removed.

Referring now to FIG. 1, a child carriage 10 of the present disclosure includes a carriage frame 100, 100', and a soft goods seat assembly 200 that is configured to removably attach to the carriage frame 100, 100'. FIGS. 2 and 3 show one example of the carriage frame 100 and FIG. 24 shows another example of the carriage frame 100'. The soft goods seat assembly 200 defines a seat for a child, such as a toddler. In some examples, the child carriage 10 includes one or both of a canopy 300 and a basket 400. The child carriage 10 is configured to be transitioned between a first seating configuration (FIG. 1), wherein the soft goods seat assembly 200 is attached to the carriage frame 100, 100' to support a child such as a toddler, and a second seating configuration (FIGS. 2, 24), wherein the soft goods seat assembly 200 is removed and the child carriage 10 is configured to support an infant car seat 500 thereon. In some examples, the child carriage 10 is transitioned to a third configuration (not shown), wherein the soft goods seat assembly 200 is attached to the carriage frame 100, 100' and the child carriage 10 supports the infant car seat 500) (shown in FIG. 3) thereon. However, a caregiver may have better visibility to a child when the child carriage 10 is in the second configuration (i.e., without the soft goods seat assembly 200) than when the child carriage 10, 10' is in the third configuration (i.e., with the soft goods seat assembly 200) because the soft goods seat assembly 200 may obstruct the caregiver's view of the child in the third configuration. Further, the child carriage 10, 10' is less bulky and weigh less in the second configuration (i.e., without the soft goods seat assembly 200) than in the third configuration (i.e., with the soft goods seat assembly 200). In at least some examples, the child carriage 10 is configured to be folded from either of the first and second seating configurations. Thus, the child carriage 10 is configured to be transitioned between one of the seating configurations and a folded configuration, wherein the child carriage 10 is collapsed for storage.

Figure 4:
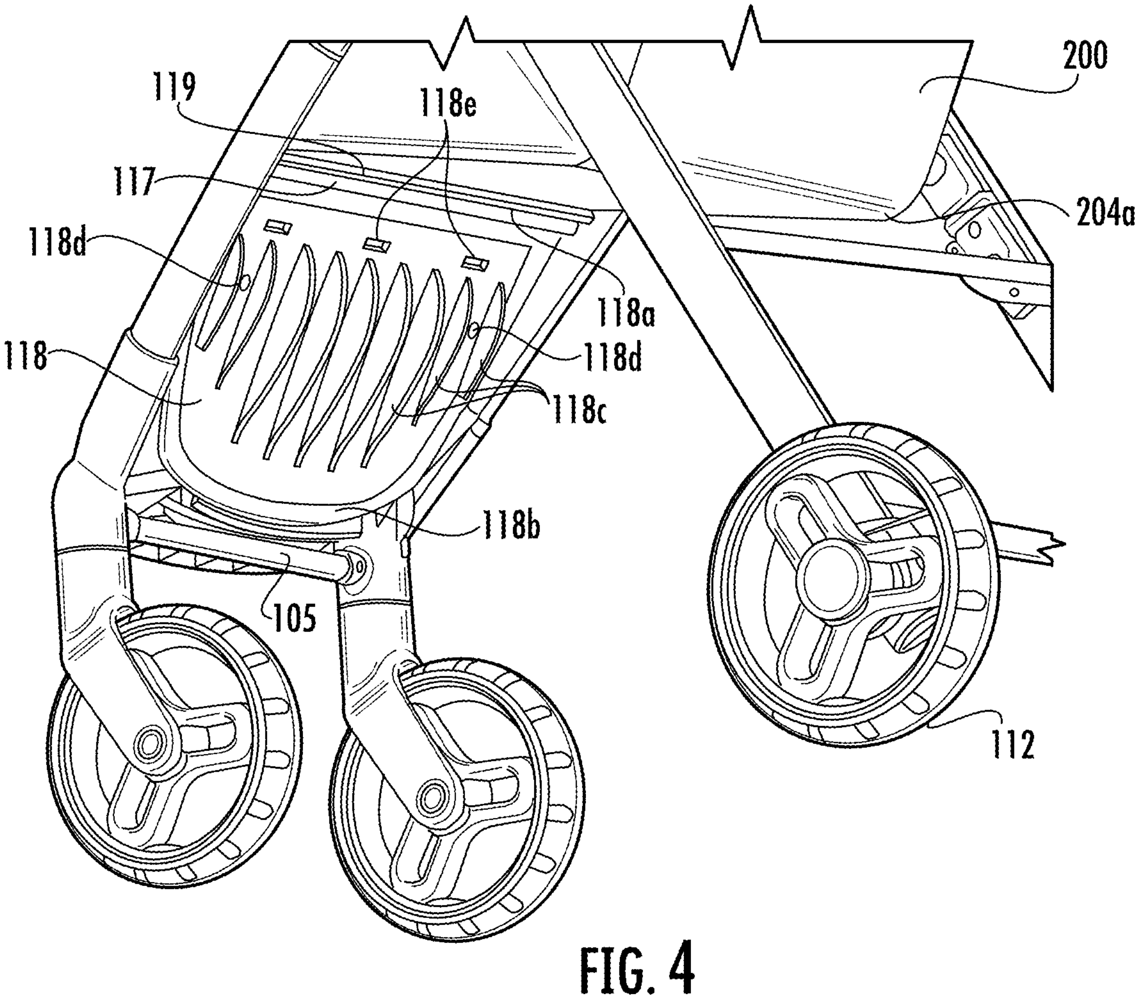
FIG. 4 shows a perspective view of a lower end of the carriage frame of FIG. 1.
Figure 5:
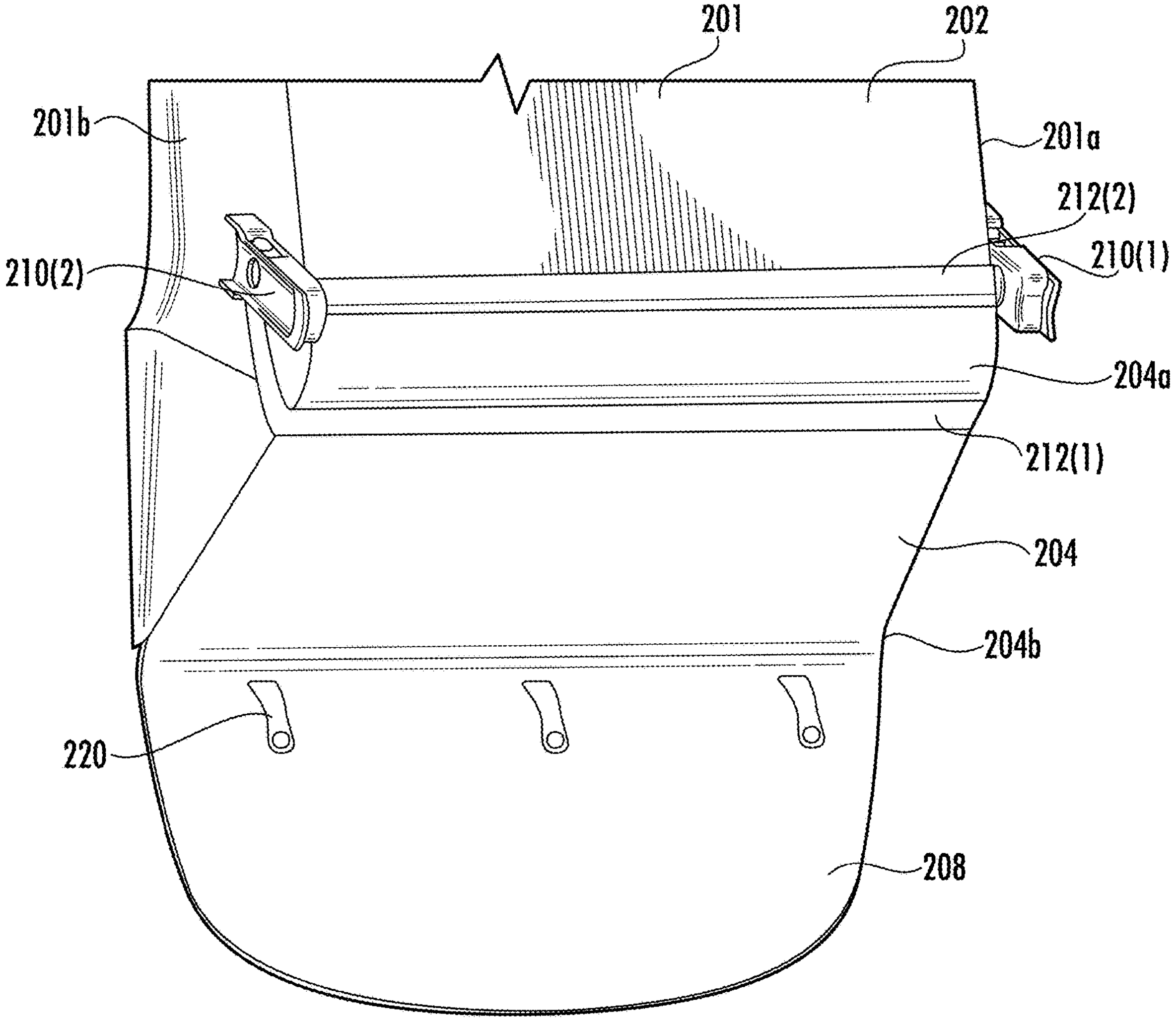
FIG. 5 shows a perspective view of an underside of the removable soft goods seat of FIG. 1.

Referring to FIGS. 1, 4 and 5, the soft goods seat assembly 200 comprises a soft goods seat 201 that has a seatback 202 and a seat pan 204. The seatback 202 is configured to support a child's back when the child is seated in the soft goods seat assembly 200. The seat pan 204 is configured to support a child's bottom when the child is seated in the soft goods seat assembly 200. The seat pan 204 extends forward from the seatback 202. A rear end of the seat pan 204 is attached to the seatback 202 at a seat bight **204*a*. The soft goods seat assembly 200 includes a pair of sidewalls 206(1), 206(2). The sidewalls 206(1), 206(2) is spaced from one another along a lateral direction A so as to define a seating space therebetween for receiving a child. Each sidewall 206(1), 206(2) extends forward from the seatback 202. Each sidewall 206(1), 206(2) extends upwards from the seat pan 204. The soft goods seat assembly 200 includes a leg pad 208. The leg pad 208 extends downwards from the seat pan 204. A front end 204*b* of the seat pan 204 is attached to the leg pad 208**.

The child carriage 10 includes a harness 400 attached to the soft goods seat assembly 200 to secure a child in the carriage 10. The harness 400 is a multi-point harness, such as a three-point or five-point harness. The harness 400 includes a crotch strap 406 having a crotch buckle 401. The harness 400 includes a first strap 402 and a second strap 404 that are configured to selectively fasten to the crotch buckle 401. The first strap 402 includes a lap belt portion that is configured to rest over a lap of a child and/or a shoulder belt portion that is configured to rest over a shoulder of a child. Similarly, the second strap 404 includes a lap belt portion that is configured to rest over a lap of a child and/or a shoulder belt portion that is configured to rest over a shoulder of a child. In alternative examples, the shoulder belt portions can be defined by third and fourth straps, rather than being formed as parts of the first and second straps 402 and 404.

Turning now more specifically to FIGS. 2, 3, and 24, a carriage frame 100, 100' of the present disclosure has a front end **100*a* and a rear end 100*b* spaced from one another along a longitudinal direction L, perpendicular to the lateral direction A. The carriage frame 100, 100' has a first side 100*c* and a second side 100*d* spaced from one another along the lateral direction A. The carriage frame 100, 100' has an upper end 100*e* and a lower end 100*f*** spaced from one another along a vertical direction V, perpendicular to the longitudinal direction L and the lateral direction A.

The carriage frame 100, 100' comprises a lower frame portion 102 and a handle 104 that extends upwards from the lower frame portion 102. The child carriage frame 100, 100' includes a plurality of wheels 112 attached to a lower end of the lower frame portion 102. The lower frame portion 102 includes a plurality of legs 106. Each of the legs 106 can have a tubular shape and are formed from a rigid material such as a metal. The legs 106 include a pair of front legs 108(1), 108(2) and a pair of rear legs 110(1), 110(2). The rear legs 110(1), 110(2) is spaced from one another along the lateral direction A. The carriage frame 100 includes a cross brace 103 that extends from a first of the rear legs 110(1) to a second of the rear legs 110(2) so as to space the rear legs 110(1), 110(2) from one another. The cross brace 103 is disposed adjacent lower ends of the rear legs 110(1), 110(2) or is disposed above the lower ends. The lower ends of the rear legs 110(1), 110(2) is spaced from a lower end of each of the front leg 108(1), 108(2) along the longitudinal direction L. The plurality of wheels 112 is attached to the lower ends of the plurality of legs 106.

FIGS. 2, 3, and 24 show examples in which the carriage frame 100, 100' comprises a pair of front legs 108(1), 108(2) and a pair of rear legs 110(1), 110(2), where each leg 106 has a wheel 112 attached to a lower end thereof. The carriage frame 100, 100' includes a cross brace 105 (labeled in FIGS. 4 and 26) that extends from a first one of the front legs 108(1) to a second one of the front legs 108(2) to space the front legs 108(1), 108(2) from one another. The cross brace 105 is disposed adjacent to lower ends of the front legs 108(1), 108(2) or is disposed above the lower ends.

In some examples, the front leg 108(1), 108(2) are rotatably coupled to each of the rear legs 110(1), 110(2). For instance, the carriage frame 100, 100' includes a first joint 114(1) that pivotably couples a first one of the rear legs 110(1) to the front leg 108(1), 108(2), and a second joint 114(2) that pivotably couples a second one of the rear legs 110(2) to the front leg 108(1), 108(2). The first and second joints 114(1), 114(2) are spaced from one another along the lateral direction A so as to at least partially define a space therebetween that is configured to receive a child seat, such as the soft goods seat assembly 200 or the infant car seat 500. Each joint 114(1), 114(2) defines a pivot axis $A_P$ that extends along the lateral direction A. Each front leg 108(1), 108(2) is configured to pivot relative to a corresponding rear leg 110(1), 110(2) along the pivot axis $A_P$ such that lower ends of the front leg 108(1), 108(2) and the rear legs 110(1), 110(2) move towards one another along the longitudinal direction L towards the folded configuration and away from one another along the longitudinal direction L towards one of the seating configurations.

The handle 104 includes a first handle portion **104*a* and a second handle portion 104*b* that are spaced from one another along the lateral direction A so as to at least partially define a receiving space therebetween. Each of the first and second handle portions 104*b* can have a tubular shape and is formed from a rigid material such as a metal. The first handle portion 104*a* extends in a upward direction from the first joint 114(1), and the second handle portion 104*b* extends upwards from the second joint 114(2). Each of the first and second handle portions 104*b* extends along a rearward direction as they extend upwards from a respective one of the first and second joints 114(1), 114(2). The first handle portion 104*a* is pivotably coupled to the first joint 114(1) and the second handle portion 104*b* is pivotably couple to the second joint 114(2). Thus, the handle 104 is configured to rotate relative to one or both of the front leg 108(1), 108(2) and the pair of rear legs 110(1), 110(2) so as to transition the child carriage 10 between a seating configuration and a folded configuration. In some examples, the handle 104 is configured to rotate towards the rear legs 110(1), 110(2)**.

The handle 104 includes a third handle portion **104*c* that defines a grasping surface that is configured to be grasped by a caregiver to push the child carriage 10. The third handle portion 104*c* extends between the first and second handle portions 104*a* and 104*b*, such as from the first handle portion 104*a* to the second handle portion 104*b*. The third handle portion 104*c* can have a tubular shape and is formed from a rigid material such as a metal. In some examples, the handle 104 can include a gripping surface, such as a rubber or foam surface, that is applied to the third handle portion 104*c*** to be gripped by a caregiver.

In some examples, the child carriage 10 includes a caregiver organizer 600, 600' attached to the handle 104. The caregiver organizer 600, 600' is attached to the first and second handle portions **104*a* and 104*b*. The caregiver organizer 600, 600' is disposed adjacent to the third handle portion 104*c* so that the caregiver organizer 600, 600' is easily accessible by a caregiver when the caregiver is pushing or pulling the child carriage 10 by the third handle portion 104*c*. The caregiver organizer 600, 600' defines recess 602**, such as a plurality of recesses, that extends into an upper end thereof and is configured to stow object such as (without limitation) a beverage container, food container, or cell phone.

With continued reference to FIGS. 2, 3, and 24, in some examples, the carriage frame 100, 100' includes first and second front legs 108(1), 108(2), and a footrest 116 that extends between first and second front legs 108(1), 108(2). The footrest 116 is configured to support a child's feet when the child is seated in the soft goods seat assembly 200. The carriage frame 100, 100' includes a leg panel 118. The leg panel 118 is positioned so as to be behind the child's legs when the child is seated in the soft goods seat assembly 200. The leg panel 118 extends between the first and second front legs 108(1), 108(2). The leg panel 118 extends between the first and second front legs 108(1), 108(2) and upwards from the footrest 116 such that the panel is aligned with the first and second front legs 108(1), 108(2). The leg panel 118 can have an upper end **118*a* and a lower end 118*b*. The lower end 118*b* is disposed adjacent to the footrest 116. The carriage frame 100, 100' defines a front support edge 119 that is configured to support a front end of a seat pan 204 (labeled in FIG. 1) of the soft goods seat assembly 200. In some examples, the front support edge 119 is defined by the upper end 118*a* of the leg panel 118**.

The carriage frame 100, 100' includes a cross brace 117 (labeled in FIG. 4) that extends between the first and second front legs 108(1), 108(2) at the upper end **118*a*, and that supports the upper end 118*a*. The upper end 118*a* of the leg panel 118 is attached to the upper cross brace 117. Thus, the upper cross brace 117 can provide structural support for the upper end 118*a* of the leg panel 118. In some examples, a backside of the leg panel 118 can have a plurality of stiffeners 118*c*, shaped like fins (labeled in FIGS. 4 and 26) that extend therefrom to provide structural support and rigidity to the leg panel 118**.

The carriage frame 100, 100' includes a pair of fold hubs 132(1), 132(2) (shown in detail in FIG. 22), each defining one of the joints 114(1), 114(2). The front leg 108(1), 108(2), the pair of rear legs 110(1), 110(2), and the handle 104 is pivotably coupled to one another at the pair of fold hubs 132(1), 132(2). The fold hubs 132(1), 132(2) are configured to rotate the front leg 108(1), 108(2), the pair of rear legs 110(1), 110(2), and the handle 104 relative to one another between a seating configuration and a folded configuration. For example, the front leg 108(1), 108(2) and the rear legs 110(1), 110(2) is configured to rotate towards one another to the folded configuration. Further, the handle 104 and the rear legs 110(1), 110(2) is configured to rotate towards one another to the folded configuration. In the folded configuration, the rear legs 110(1), 110(2) is disposed between the handle 104 and the front leg 108(1), 108(2). One or both of the fold hubs 132(1), 132(2) can have a fold latch that is configured to releasably lock the child carriage 10 in a seating configuration.

The carriage 10 includes an armrest 134 for the child that is pivotably coupled to the carriage frame 100, 100' at the pair of fold hubs 132(1), 132(2). The armrest 134 defines a tray as shown, configured to support items such as a beverage container, or defines an armbar. The armrest 134 extends along the lateral direction A from the first fold hub 132(1) to the second fold hub 132(2). The armrest 134 extends across a lap of a child when the child is seated in the soft goods seat 201. The armrest 134 is configured to rotate between a folded position and a deployed position. For instance, the armrest 134 is configured to rotate relative to the handle 104 and the front leg 108(1), 108(2) to the folded position when the carriage frame 100, 100' is transitioned to the folded configuration such that the armrest 134 is disposed against the front leg 108(1), 108(2). Further, the armrest 134 is configured such that, when the carriage frame 100, 100' is transitioned from the folded configuration to the seating configuration, the armrest 134 remains in the folded position and must be engaged by a caregiver to rotate the armrest 134 upwards to the deployed position.

Figure 22:
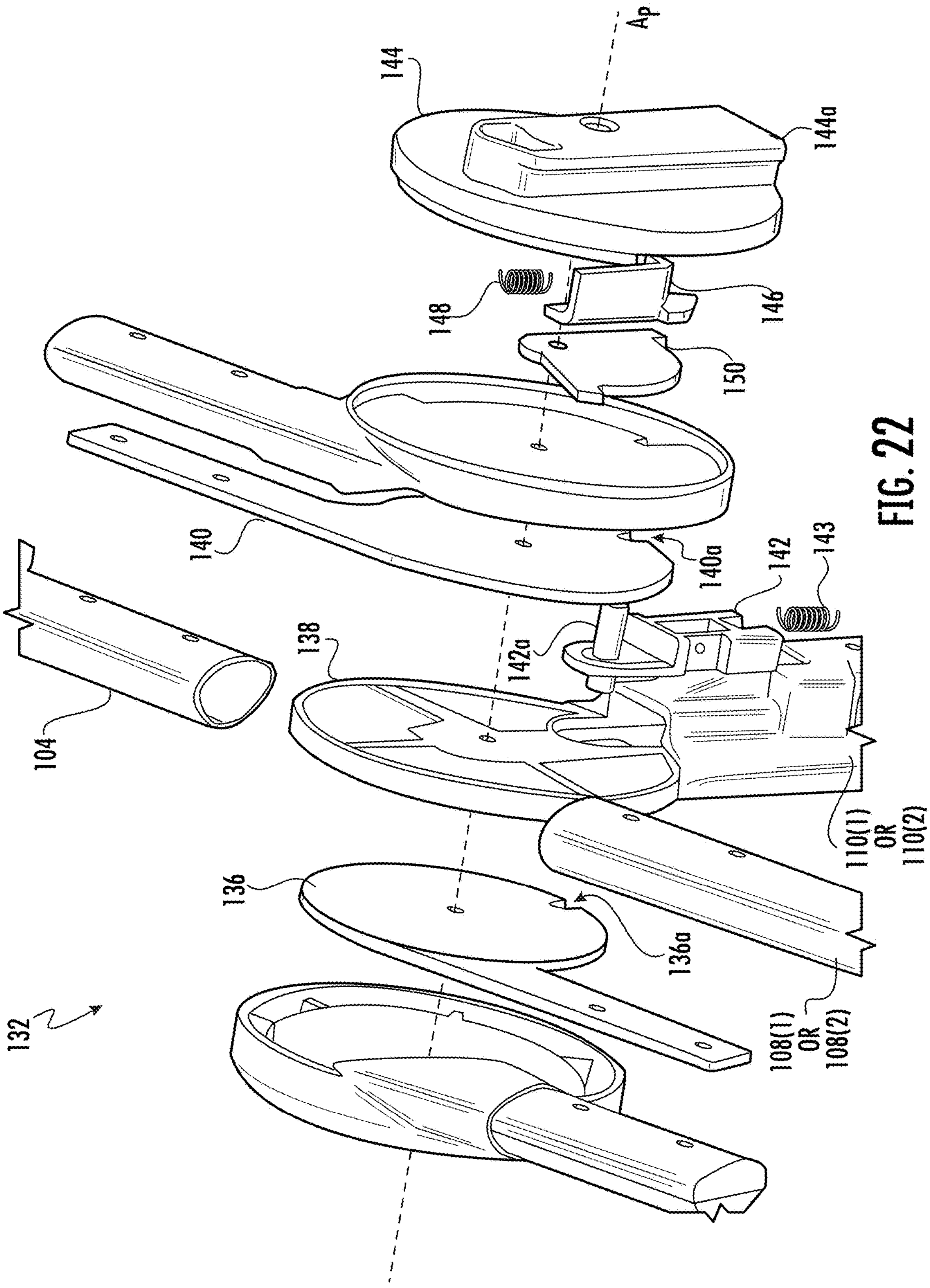
FIG. 22 shows an exploded view of a fold hub of the carriage frame of FIG. 2.

Referring to FIG. 22, an example of a fold hub 132 is shown that is used to implement one or both of the fold hubs 132(1), 132(2). In general, the fold hub 132 has a front leg plate 136, a rear leg plate 138, and a handle plate 140 that are pivotably coupled to one another. The front leg plate 136 is positionally fixed to a front leg 108(1), 108(2) such that rotation of the front leg 108(1), 108(2) causes a corresponding rotation of the front leg plate 136. The rear leg plate 138 is positionally fixed to a rear leg 110(1), 110(2) such that rotation of the rear leg 110(1), 110(2) causes a corresponding rotation of the rear leg plate 138. The handle plate 140 is positionally fixed to the handle 104 such that rotation of the handle 104 causes a corresponding rotation of the handle plate 140. The front leg plate 136, the rear leg plate 138, and the handle plate 140 is aligned with one another along the pivot axis $A_p$.

The fold hub 132 can include a fold latch 142 that is configured to releasably lock the child carriage 10 in a seating configuration. The fold latch 142 is configured to transition between a latched position in which the fold latch 142 prevents the carriage frame 100, 100' from folding, and an unlatched position in which the carriage frame 100, 100' is permitted to fold. The fold latch 142 is rotationally fixed relative to one of the front leg plate 136, the rear leg plate 138, and the handle plate 140, and is configured to releasably engage the other two of the front leg plate 136, the rear leg plate 138, and the handle plate 140 so as to rotationally lock the front leg 108(1), 108(2), the rear leg 110(1), 110(2), and the handle 104 relative to one another.

For instance, FIG. 22 shows one specific example in which the fold latch 142 is rotationally fixed relative to the rear leg plate 110(1), 110(2), and is configured to releasably engage the front leg plate 136 and the handle plate 140. The fold latch 142 is translatable along an axis of the rear leg 110(1), 110(2) relative to the rear leg plate 110(1), 110(2). The fold latch 142 comprises a protrusion **142*a* that is configured to be received in a recess 136*a* of the front leg plate 136 and a recess 140*a* of the handle plate 140 when the carriage frame 100, 100' is in the seating position so as to rotationally lock the front leg 108(1), 108(2), the rear leg 110(1), 110(2), and the handle 104 relative to one another. The protrusion 142*a* is translated out of the recesses 136*a* and 140*a* so as to unlock the front leg 108(1), 108(2), the rear leg 110(1), 110(2), and the handle 104 relative to one another, thereby allowing the carriage frame 100, 100' to transition to the folded configuration. The protrusion 142*a* is biased towards a latched position, wherein the protrusion 142*a* is configured to be received in the recesses 136*a* and 140*a*. For instance, and with reference to FIGS. 22 and 23, the protrusion 142*a* is biased by a spring or resilient member 143. The protrusion 142*a* is moved to an unlatched position, wherein the protrusion 142*a* is removed from the recesses 136*a* and 140*a*. In an aspect, the protrusion 142*a* can be removed from the recesses 136*a* and 140*a* by a cable (not shown). The cable can be connected to the fold latch 142 on one end, and engageable by the caregiver on another end. The cable can be wrapped around a pulley (not shown) disposed, for example, at least partially in the rear leg 110(1), 110(2). When the caregiver applies enough force to the cable to overcome a biasing force provided by the resilient member 143, the protrusion 142*a* can be removed from the recesses 136*a* and 140*a***.

Figures 23A, 23B, 23C, 23D, 23E, 23F:
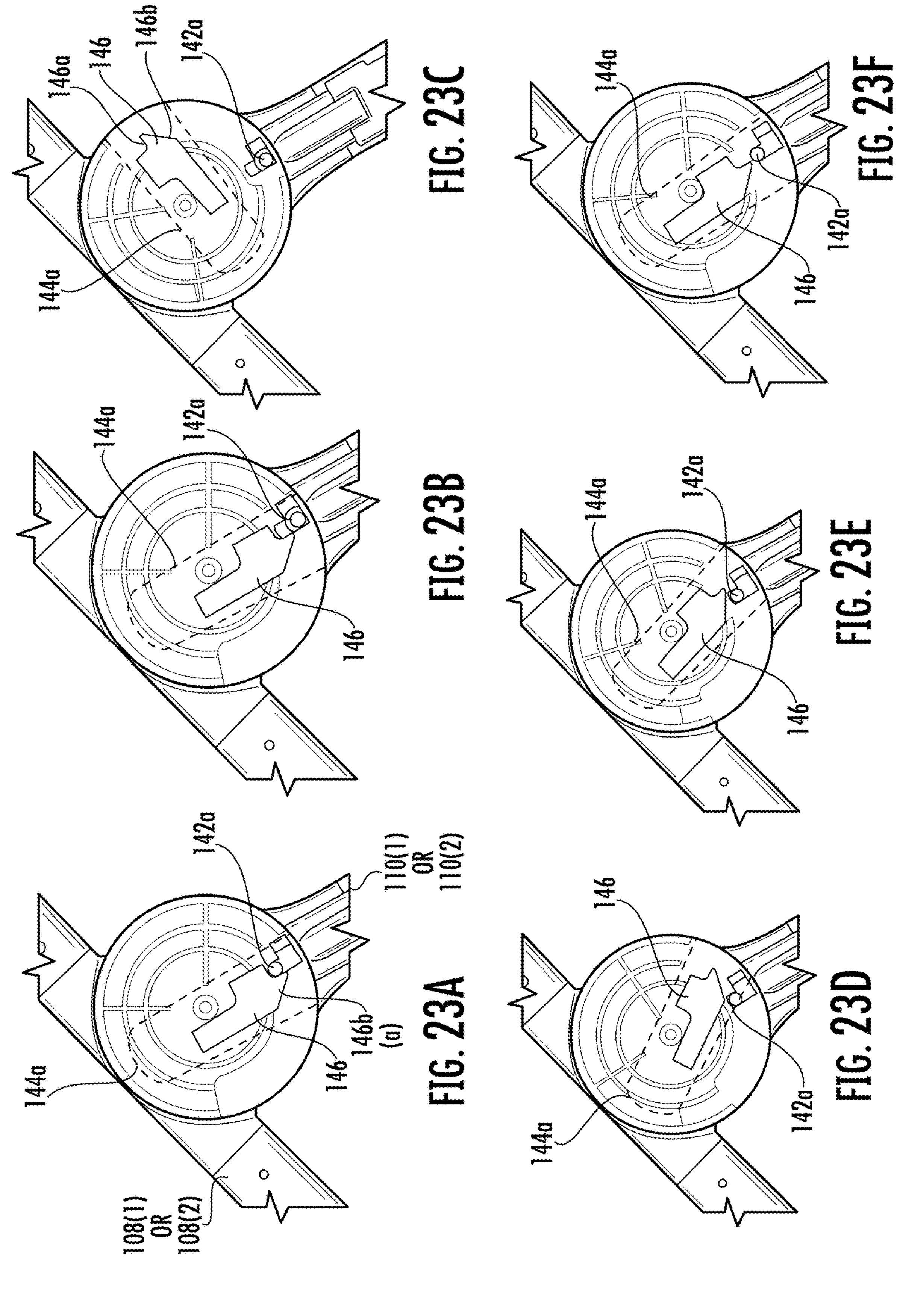
FIGS. 23(*a*)-(*f*) show a side view of the fold hub of FIG. 22 in multiple positions with an outer cover shown transparently to illustrate an armrest latch of the carriage frame.

Referring to FIGS. 22 and 23, the carriage frame 100, 100' includes an armrest hub 144 that couples the armrest 134 to the fold hub 132. The armrest hub 144 includes am armrest coupler 144 a that removably couples to the armrest 134 such that the armrest 134 is rotationally fixed to the armrest hub 144. In one example, the armrest coupler 144 a is one of a T-track and a recess that engages another of a T-track and a recess of the armrest 134. However, it will be understood that, in alternative examples, the armrest coupler 144 a is any suitable coupler. Alternatively, the armrest hub 144 is fixedly attached to the armrest 134. The carriage frame 100 includes an armrest latch 146 that is configured to releasably lock the armrest 134 in the deployed configuration. The armrest latch 146 is rotationally fixed to the armrest hub 144. The armrest latch 146 is configured to translate relative to the armrest hub 144 between an engaged position (FIG. 23(*a*)) and a disengaged position (FIG. 23(*b*)). In the engaged position, the armrest latch 146 is configured to engage the protrusion 142 a of the fold latch 142 so as to prevent the armrest 134 from moving from the deployed position to the folded position. The carriage frame 100 includes a spring or resilient member 148 that biases the protrusion 142 a towards the engaged position. In the disengaged position, the armrest latch 146 is configured to disengage from the protrusion 142 a of the fold latch 142 so as to allow the armrest 134 to rotate from the deployed position (FIG. 23(*b*)) to the folded position (FIG. 23(*c*)).

The armrest latch 146 has an engagement surface 146 a that is configured to engage the protrusion 142 a in the engaged position so as to prevent the armrest 134 from rotating to the folded position. The protrusion 142 a is disengaged from the engagement surface 146 a of the armrest latch 146 when the fold latch 142 is moved from the latched position to the unlatched position. The armrest latch 146 can have a ramped surface 146 b that is configured to engage the protrusion 142 a as the armrest 134 is moved from the folded position to the deployed position. The ramped surface 146 b can ride along the protrusion 142 a (FIGS. 23(*d*) and 23(*e*)) so as to cause the armrest latch 146 to translate to the disengaged position, and the armrest latch 146 can resiliently move back to the engaged position after the protrusion 142 a has passed the ramped surface 146 b (FIG. 23(*f*)). The carriage frame 100, 100' includes a stop 150 that is rotationally fixed to the armrest hub 144. The stop 150 is configured to limit rotation of the armrest 134 when the armrest 134 is rotated to the deployed position. The stop 150 can engage the protrusion 142 a to limit rotation of the armrest 134 beyond the deployed position.

Turning now to FIGS. 35 to 38, the carriage frame 100, 100' includes a fold actuator 160 that is configured to be engaged by a caregiver to transition each fold latch 142 (labeled in FIG. 22) between the latched position in which the carriage 10 is prevented from being folded, and the unlatched position in which the carriage 10 is permitted to fold. The actuator 160 includes a first strap 162, such as a webbing, that is operatively coupled to each of the fold latch 142 such that movement of the first strap 162 along an actuation direction causes the fold latch 142 to transition to the unlatched position. The actuation direction is, for example, upwards, and the movement can include, for example, pulling the first strap 162 upwards. The first strap 162 extends between the first and second sides 100*c* and 100*d* of the carriage frame 100, 100'.

Figure 37:
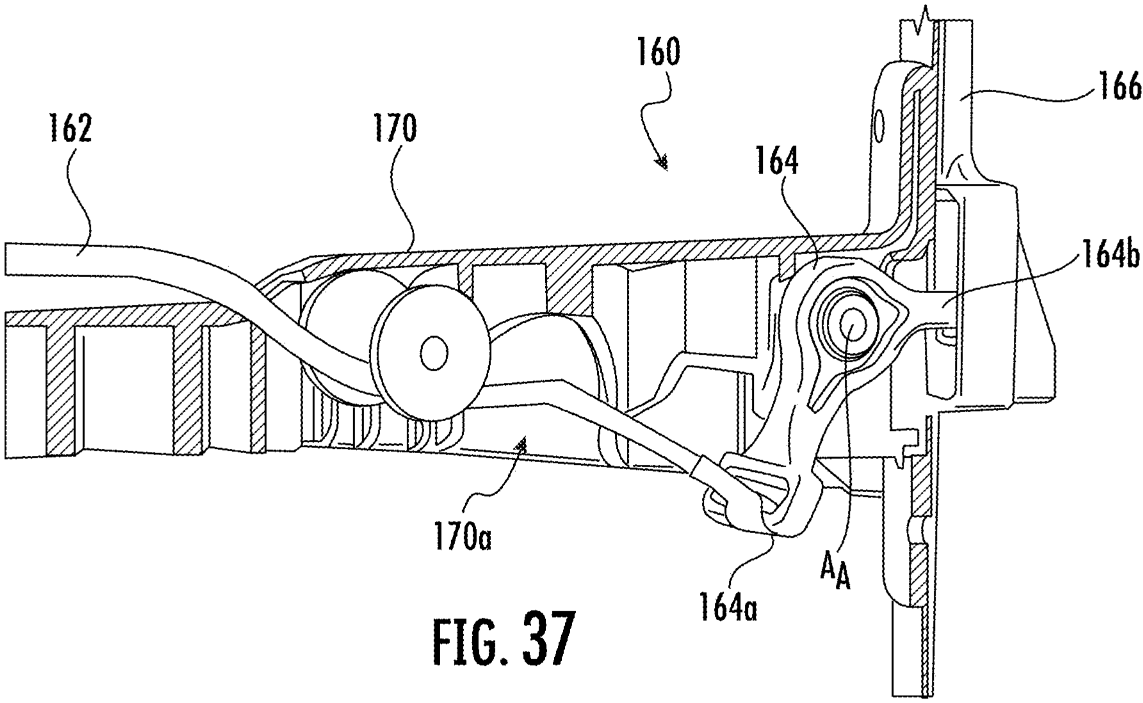
FIG. 37 shows a cross-sectional view of a crosspiece of the carriage frame of FIGS. 1, 2, and 24, illustrating a portion of a fold actuator of the carriage frame in an unactuated position.
Figure 38:
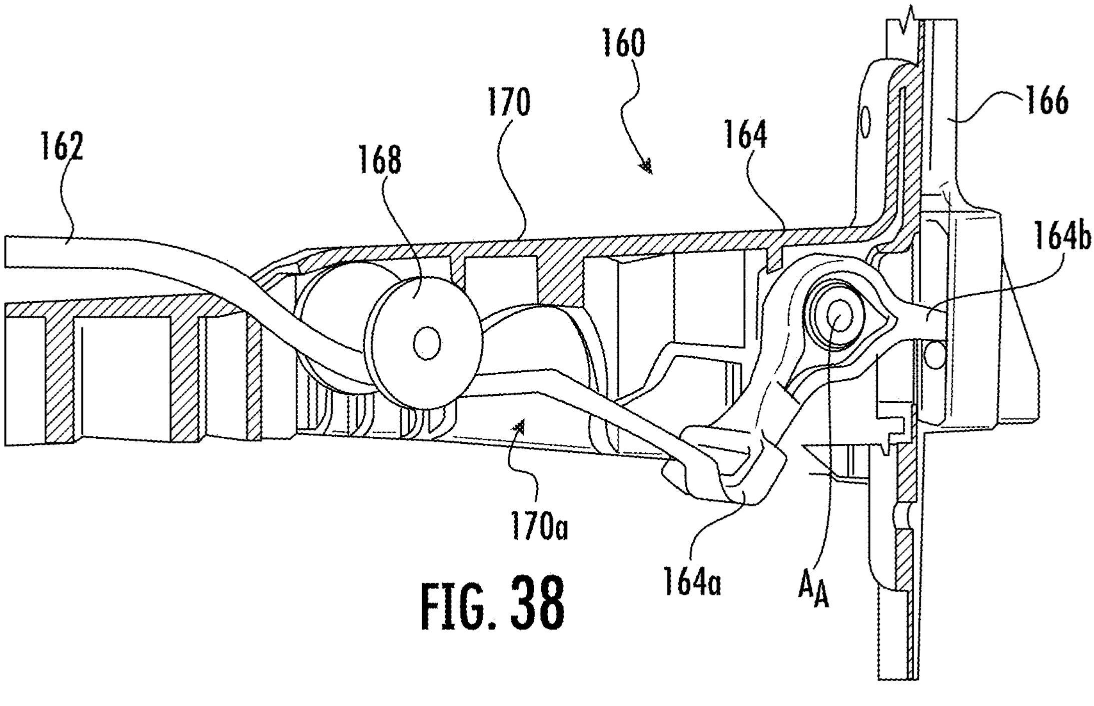
FIG. 38 shows a cross-sectional view of a crosspiece of the carriage frame of FIGS. 1, 2, and 24, illustrating a portion of the fold actuator of the carriage frame in an actuated position.

The actuator 160 is configured to convert movement of the first strap 162 along the actuation direction to movement of the fold latch 142 (labeled in FIG. 22) to the unlatched position. For instance, in FIGS. 22 and 23, the fold latch 142 moves downwards to the unlatched position. In some examples, the actuator 160 includes, for each fold latch 142, a pivoting body 164 that is configured to pivot about a pivot axis AA, and a linkage 166. Note that FIGS. 37 and 38 illustrate one of the pivoting bodies 164 and one of the linages 166, and that the other pivoting body 164 and linkage 166 would be a mirror image of that shown. Each pivoting body 164 can have a first end 164 a that is attached to the first strap 162, and a second end 164 b that is coupled to a corresponding linkage 166. Each pivoting body 164 is configured to pivot about the pivot axis AA so as to move the corresponding linkage 166 along a direction that causes movement of the fold latch 142 between the latched and unlatched positions. Each linkage 166 is a cable, band, rod, or other suitable linkage. One end of each linkage 166 is attached to the fold latch 142. The actuator 160 can optionally include pulley 168 for each pivoting body 164 that is configured to guide movement of the first strap 162 as the first strap 162 is moved along the actuation direction.

The carriage frame 100, 100' includes a crosspiece 170 that extends between the first and second sides 100*c* and 100*d* of the carriage frame 100, 100', from the first rear leg 110(1) to the second rear leg 110(2). The crosspiece 170 is configured to shield at least a portion of the first strap 162 from accidental engagement, such as engagement that might occur when a caregiver places an object in the basket 400. For example, a portion of the first strap 162 that is shielded is disposed under or within the crosspiece 170. In some examples, the crosspiece 170 includes a recess 170*a*. At least a portion of the first strap 162 is disposed in the recess 170*a*, and at least a portion of the first strap 162 is exposed outside of the recess 170*a*. In some examples, a first end and a second end of the first strap 162 is disposed in the recess 170*a*, and a middle portion of the first strap 162 extends outside of the recess 170*a* so as to be accessible to a caregiver.

Figure 35:
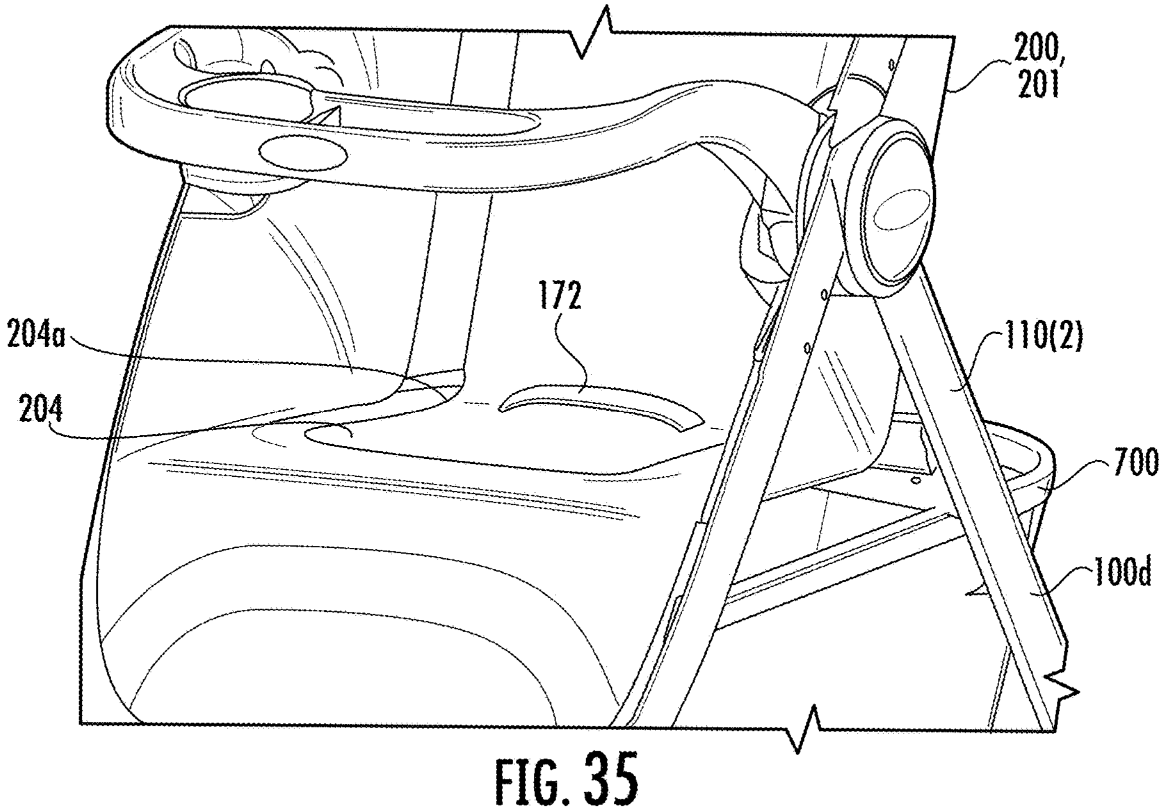
FIG. 35 shows a front perspective view of a lower portion of the child carriage of FIGS. 1, 2, and 24.

A portion of the first strap 162, such as the middle portion of the first strap 162, is configured to be accessible by a caregiver when the soft goods seat 201 is removed from the carriage frame 100, 100'. In some examples (not shown), a portion of the first strap 162, such as the middle portion of the first strap 162, is configured to be accessible to a caregiver from above the seat pan 204 or seat bight 204*a*. For example, the portion could extend along the seat pan 204 or seat bight 204*a*. In other examples, the soft goods seat assembly 200 includes a second strap 172, and the child carriage 10 includes a coupler 174, such as a clip, that is configured to removably couple the first strap 162 and the second strap 172 to one another. At least a portion of the second strap 172 is accessible to a caregiver from above the seat pan 204 or seat bight 204*a*. For example, the portion could extend along the seat pan 204 or seat bight 204*a* as illustrated in FIG. 35. At least a portion of the second strap 172 is disposed below the seat pan 204 or seat bight 204*a* such that the portion is removably coupled to the first strap 162 by the coupler 174 (shown in FIG. 36). The carriage 10 is folded using a single hand by grasping the carriage 10 by either the first strap 162 (e.g., when the seating soft goods 201 is removed) or the second strap 172 (e.g., when the seating soft goods 201 are installed) and pulling the carriage 10 upwards by the first or second strap 162 or 172. As the first or second strap 162 or 172 is pulled upwards, the actuator 160 causes each fold latch 142 to move from the latched position to the unlatched position such that the handle 104 and front leg 108(1), 108(2) rotate towards the pair of rear legs 110(1), 110(2) to the folded configuration via gravity.

The second strap 172 is affixed to the soft goods seat 201 such that removal of the soft goods seat assembly 200 from the carriage frame 100, 100' causes the second strap 172 to be removed from the carriage frame 100, 100' along with the soft goods seat 201. The first strap 162 is configured such that removal of the soft goods seat assembly 200 from the carriage frame 100, 100' does not cause the first strap 162 to be removed from the carriage frame 100, 100'. In other words, the first strap 162 is configured to remain with the carriage frame 100, 100' when the soft goods seating assembly 200 is removed from the carriage frame 100, 100'.

Figure 39:
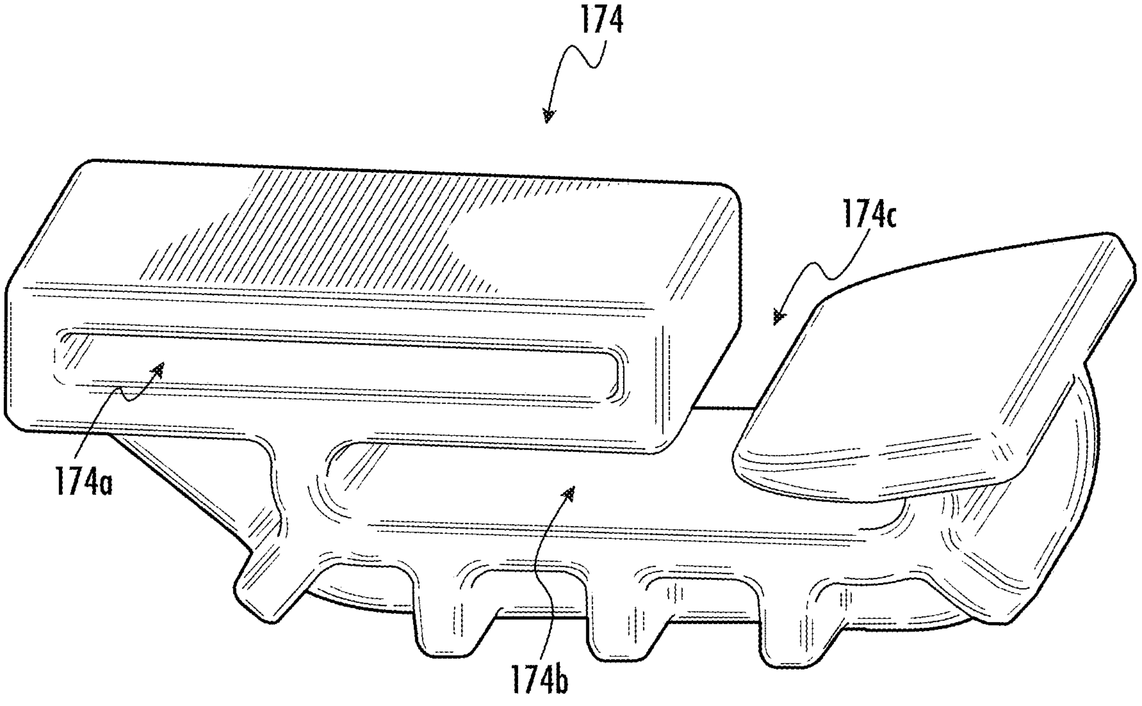
FIG. 39 shows a perspective view of a coupler of FIGS. 1, 2, and 24 that is configured to couple a pair of actuator straps of the child carriage to one another.

FIG. 39 shows one example of the coupler 174. The coupler 174 can have opening configured to receive the first strap 162 and the second strap 172. For example, the coupler 174 can have a first hole 174*a* that is configured to receive one of the first strap 162 and the second strap 172. The coupler 174 can have a second opening 174*b* that is configured to receive another one of the first strap 162 and the second strap 172. The second hole 174*b* defines an opening 174*c* at an outer surface of the coupler 174 such that the other one of the first and second strap 162 and 172 is moved into and out of the second hole 174*b* through the opening 174*c*.

Referring to FIGS. 1, 2, and 24, the soft goods seat assembly 200 is configured to removably attach directly to the carriage frame 100, 100', without attaching to a separate seat frame that is attached to the carriage frame 100, 100'. In fact, the child carriage 10 is devoid of a seat frame that is attached (removably or fixedly) to the carriage frame 100, 100'. The carriage frame 100, 100' can optionally be devoid of a solid seat support surface or seat support tubes that extend underneath the seat pan 204 of the soft goods seat assembly 200 to support the seat pan 204. Rather, the seat pan 204 is attached to the carriage frame 100, 100' at the front end 204*b* and at the seat bight 204*a* such that the seat pan 204 is suspended between the front end 204*b* and the seat bight 204*a* and between the first and second front legs 106. Note that the soft goods seat assembly 200 includes a stiffener in each of the seat pan 204 and/or seatback 202, wherein removal of the soft goods seat assembly 200 causes removal of the stiffener(s). Each stiffener is disposed layers of fabric of the soft goods seat assembly 200 or otherwise attached thereto. The seatback 202 can additionally be attached to the carriage frame 100, 100' along the handle 104, such as along the first and second handle portions 104*a* and 104*b*. As will be described in further detail below, the child carriage 10 comprises a plurality of couplers that are configured to removably couple the soft goods seat assembly 200 to the carriage frame 100, 100'. In at least some examples, the soft goods seat assembly 200 is removed from the carriage frame 100, 100' without the use of tools.

A first example of how the soft goods seat assembly 200 is removably coupled to the carriage 100 will now be described in relation to FIGS. 2 to 21. Turning to FIG. 5, the soft goods seat assembly 200 includes a first leg coupler 210(1) and a second leg coupler 210(2) fixedly attached to the soft goods seat 201. Each leg coupler 210(1), 210(2) is configured to removably couple the seat bight 204*a* of the soft goods seat assembly 200 to a leg of the carriage frame 100. The leg couplers 210 is fixedly attached to the soft goods seat 201 adjacent the seat bight 204*a*. The leg couplers 210 is spaced from one another along the lateral direction A. For instance, the first and second leg couplers 210(1), 210(2) is disposed at first and second sides 201*a* and 201*b* of the soft goods seat 201.

In some examples, the soft goods seat assembly 200 includes a support strap 212(1), 212(2) that is attached to the soft goods seat 201 adjacent to the seat bight 204*a*. Each support strap 212(1), 212(2) is, for example, a textile webbing, rope, or cord. The support strap 212(1), 212(2) extends from the first side 201*a* of the soft goods seat 201 to the second side 201*b* of the soft goods seat 201. The first and second sides 201*a* and 201*b* is spaced from one another along the lateral direction A. The support strap 212(1), 212(2) is attached to the soft goods seat 201 using any suitable technique, such as a sewing or passing the strap through a fabric tunnel in the soft goods seat 201. The support strap 212(1), 212(2) is attached to the soft goods seat 201 as it extends along the soft goods seat 201 between the first and second sides 201*a* and 201*b*. For instance, the soft goods seat 201 can have a width from the first side 201*a* to the second side 201*b*, and the support strap 212(1), 212(2) is attached to the soft goods seat 201 along at least 50% of the width or as long an entirety of the width.

Each support strap 212(1), 212(2) is elongated along the lateral direction A. Each support strap 212(1), 212(2) can have a length along the lateral direction A that is greater than the width of the soft goods seat 201 along the lateral direction A. Thus, each support strap 212(1), 212(2) extends beyond the first and second sides 201*a* and 201*b* of the soft goods seat 201. Each support strap 212(1), 212(2) is attached to the first and second leg couplers 210(1), 210(2). For example, each support strap 212(1), 212(2) is fixedly attached to the first and second leg couplers 210(1), 210(2) by a rivet, screw, or another suitable fastener. Each support strap 212(1), 212(2) can have a fixed length between the first and second leg couplers 210(1), 210(2). The fixed length is selected such that a desired tension is applied to each support strap 212(1), 212(2) when the first and second leg couplers 210(1), 210(2) are coupled to the carriage frame 100, without a need for the caregiver to adjust the tension applied to each support strap 212(1), 212(2). In fact, the length of each support strap 212(1), 212(2) is fixed such that the tension applied to each support strap 212(1), 212(2) cannot be adjusted. Fixing the length of each support strap 212(1), 212(2) can ensure that the soft goods seat 201 is easily and reliably installed, without concern of a caregiver failing to properly tension each support strap 212(1), 212(2).

FIG. 5 shows one example in which the soft goods seat assembly 200 comprises first and second support straps 212(1) and 212(2). The first support strap 212(1) is attached to the soft goods seat 201 under the seat pan 204 adjacent to the seat bight 204*a*. The first support strap 212(1) is configured to provide structural support to the soft goods seat 201 underneath the seat pan 204. Thus, the first support strap 212(1) is configured to provide structural support to resist movement of the seat pan 204 along the vertical direction V. The second support strap 212(2) is attached to the soft goods seat 201 along the seatback 202 adjacent to the seat bight 204*a*. The second support strap 212(2) is configured to provide structural support to the soft goods seat 201 behind the seatback 202. Thus, the second support strap 212(2) is configured to provide structural support to resist movement of the seatback 202 along the longitudinal direction L.

Figure 6:
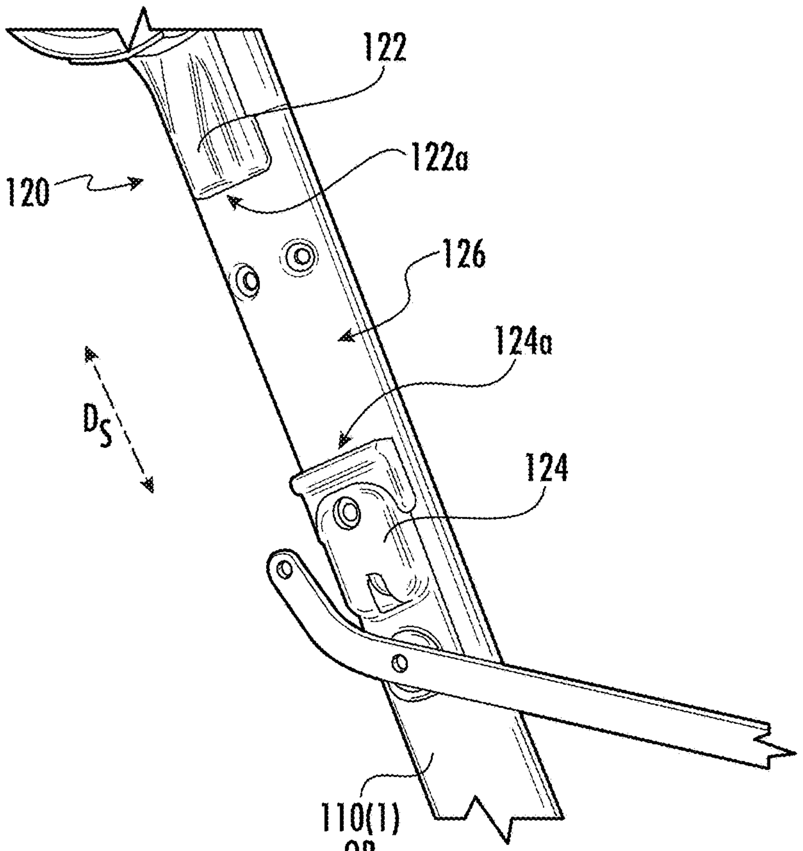
FIG. 6 shows a perspective view of a rear leg of the carriage frame of FIG. 2, the rear leg having a seat bight coupler that is configured to couple to a seat bight coupler of the soft goods seat so as to couple a seat bight of the soft goods seat to the carriage frame.
Figure 7:
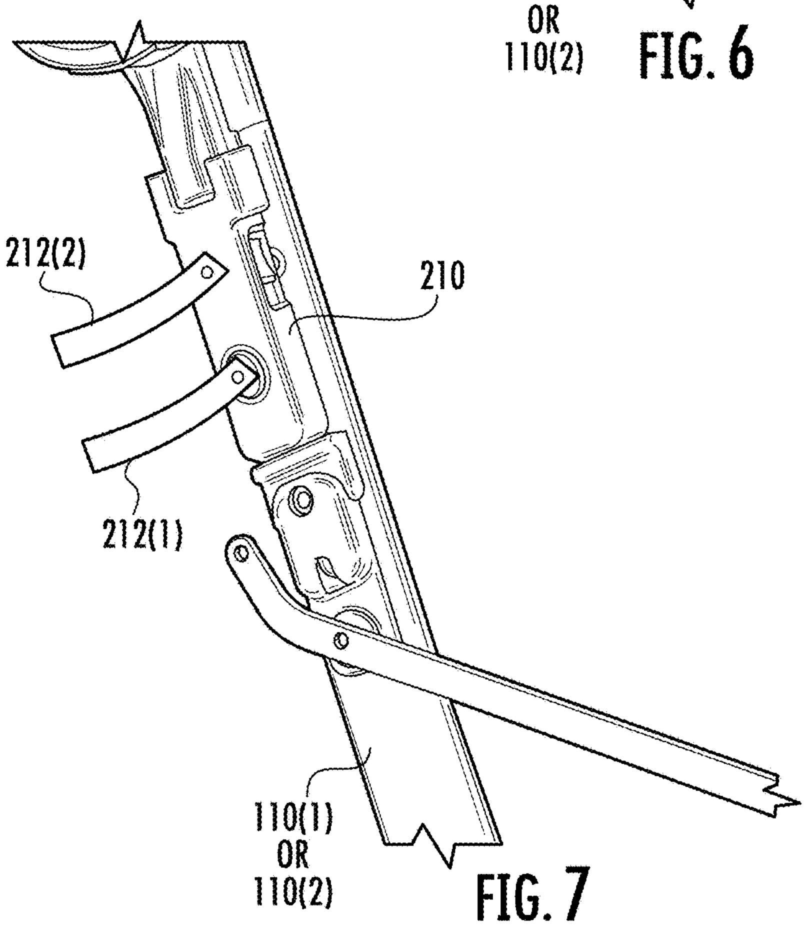
FIG. 7 shows a perspective view of the rear leg of FIG. 6, with the seat bight coupler of the soft goods seat coupled to the seat bight coupler of the leg.
Figure 10:
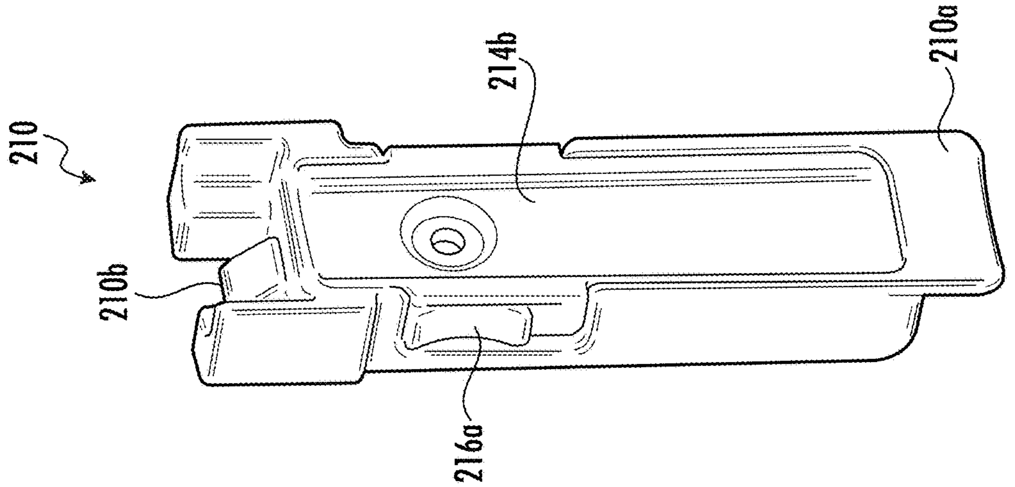
FIG. 10 shows a second perspective view of the seat bight coupler of the soft goods seat of FIG. 7.
Figure 9:
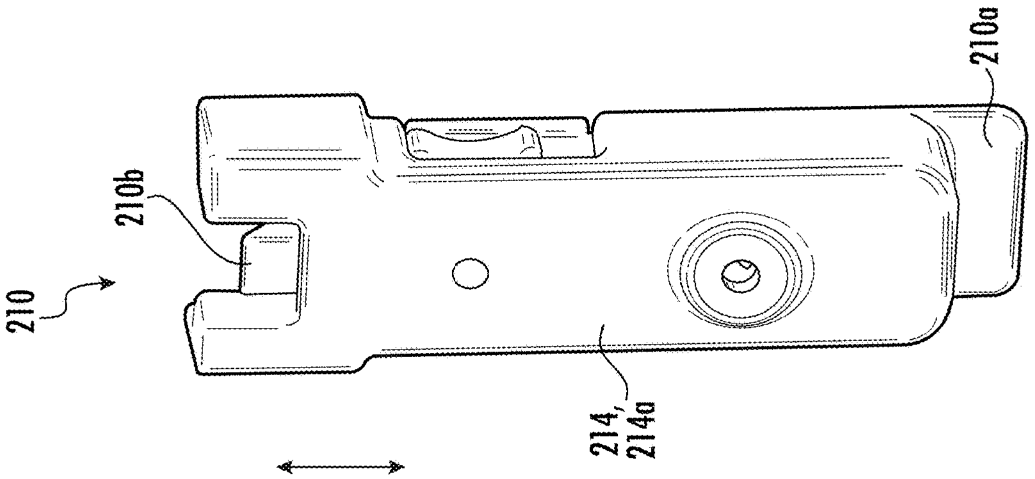
FIG. 9 shows a first perspective view of the seat bight coupler of the soft goods seat of FIG. 7.
Figure 8:
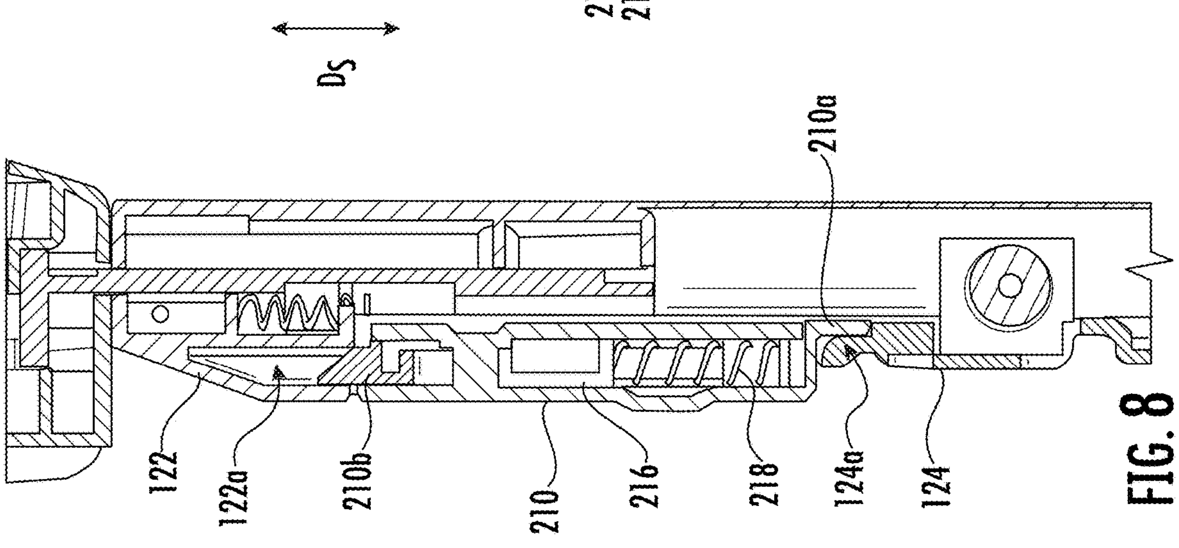
FIG. 8 shows a cross-sectional view of the rear leg of FIG. 7, with the seat bight coupler of the soft goods seat coupled to the seat bight coupler of the leg.

Referring to FIGS. 6 and 7, the leg couplers 210(1), 210(2) are configured to removably couple to the carriage frame 100. For example, each leg coupler 210(1), 210(2) is configured to removably couple to a corresponding rear leg 110(1), 110(2) of the carriage frame 100. The carriage frame 100 includes first and second leg couplers 120(1), 120(2) (coupler 120(2) is labeled in FIG. 3) that are configured to couple to the first and second leg couplers 210(1), 210(2), respectively, of the soft goods seat assembly 200. The leg couplers 120(1), 120(2), 210(1), and 210(2) is any suitable couplers. The leg couplers 120(1), 120(2) of the carriage frame 100 is rigidly attached to the carriage frame 100 such that the leg couplers 120(1), 120(2) are positionally fixed relative to the carriage frame 100. Thus, movement of the carriage frame 100 can cause a corresponding movement of the leg couplers 210(1), 210(2). Similarly, the leg couplers 210(1), 210(2) of the soft goods seat assembly 200 is configured to rigidly attach to the carriage frame 100 such that the leg couplers 210(1), 210(2) are positionally fixed relative to the carriage frame 100. For example, the leg couplers 210(1), 210(2) of the soft goods seat assembly 200 is configured to rigidly attach to the leg couplers 120(1), 120(2), respectively, of the carriage frame 100 such that the leg couplers 210(1), 210(2) are positionally fixed relative to the carriage frame 100. Thus, movement of the carriage frame 100 causes a corresponding movement of the leg couplers 210(1), 210(2). The leg couplers 120(1), 120(2) is preferably configured to be removed from the leg couplers 210(1), 210(2), and hence the carriage frame 100, by a user without using a removal tool or tools. However, in alternative examples, the removal can require the use of a tool or tools.

FIGS. 6 and 7 show one specific example of couplers 120 and 210 that may be used to implement the leg couplers 120(1), 120(2), 210(1), and 210(2); however, it will be understood that suitable alternative couplers may be employed. In this example, the leg coupler 120 has a first portion 122 and a second portion 124 that are spaced from one another along a select direction $D_S$ so as to define a space 126 therebetween that is configured to receive a corresponding one of the leg couplers 210 of the soft goods seat assembly 200. In some examples, the select direction $D_S$ is aligned with an axis of a corresponding one of the rear legs 110(1), 110(2). The first and second portions 122 and 124 is formed from a polymer, such as a plastic, or another suitably rigid material. The first and second portions 122 and 124 is fixed attached to the carriage frame 100. For example, one or both of the first and second portions 122 and 124 is attached to the carriage frame 100 by a rivet, screw; or another suitable fastener. In one example, the first and second portions 122 and 124 is attached to an inner side of the carriage frame 100.

In general, the first portion 122 can have one of a protrusion and an opening (described below with reference to FIGS. 6 to 10), and the corresponding leg coupler 210 can have another of a protrusion and an opening that is configured to engage the one of the protrusion and the opening of the first portion 122 to couple the first portion 122 and the corresponding leg coupler 210 to one another. Similarly, the second portion 124 can have one of a protrusion and an opening, and the corresponding leg coupler 210 can have another of a protrusion and an opening that is configured to engage the one of the protrusion and the opening of the second portion 124 to couple the second portion 124 and the corresponding leg coupler 210 to one another. At least one of the protrusions is configured to move while the corresponding leg coupler 210 of the soft goods seat assembly 200 is being engaged with the corresponding leg coupler 120 of the carriage frame 100, and extend into a corresponding opening to lock the leg coupler 210 of the soft goods seat assembly 200 to the leg coupler 120 of the carriage frame 100. In some examples, one of the protrusions is fixed and the other of the protrusions is movable (e.g., flexible or retractable). In such examples, the leg coupler 210 of the soft goods seat assembly 200 is engaged with the corresponding leg coupler 120 of the carriage frame 100 by engaging the fixed protrusion with a corresponding opening, rotating the leg coupler 210 to align the movable protrusion with a corresponding opening, and releasing the movable protrusion to allow the movable protrusion to be received in the corresponding opening.

In the example of FIGS. 6 to 10, the first and second portions 122 and 124 each define an opening 122*a*, 124*a*. The openings 122*a* and 124*a* face towards one another. The leg coupler 210 of the soft goods seat assembly 200 comprises a rigid protrusion 210*a* and a movable protrusion 210*b*. The rigid protrusion 210*a* extends from a lower end of the leg coupler 210, although it could alternative extend from the upper end of the leg coupler 210. The movable protrusion 210*b* extends from the upper end of the leg coupler 210, although it could alternative extend from the lower end of the leg coupler 210. The movable protrusion 210*b* is movable relative to the rigid protrusion 210*a*.

Figure 11:
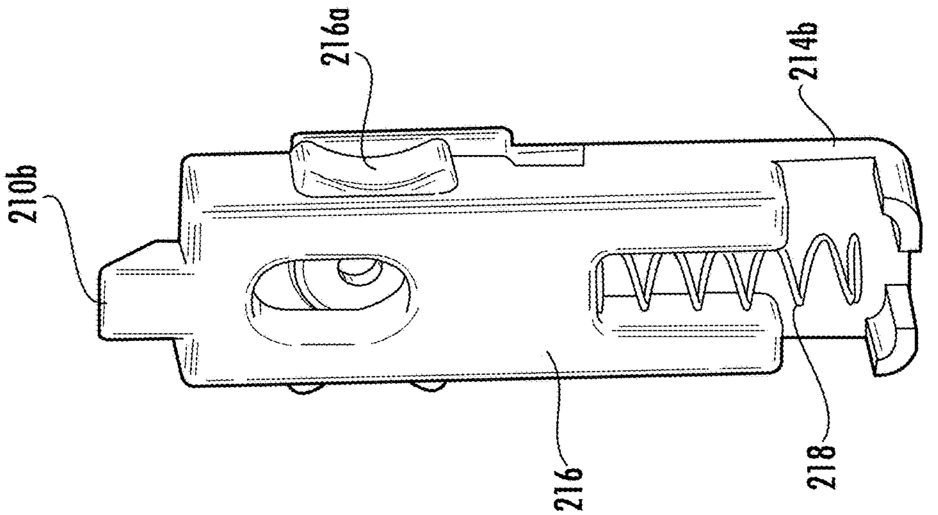
FIG. 11 shows a first perspective view of the seat bight coupler of the soft goods seat of FIG. 9, with a portion of a housing removed to reveal a movable shuttle.
Figure 12:
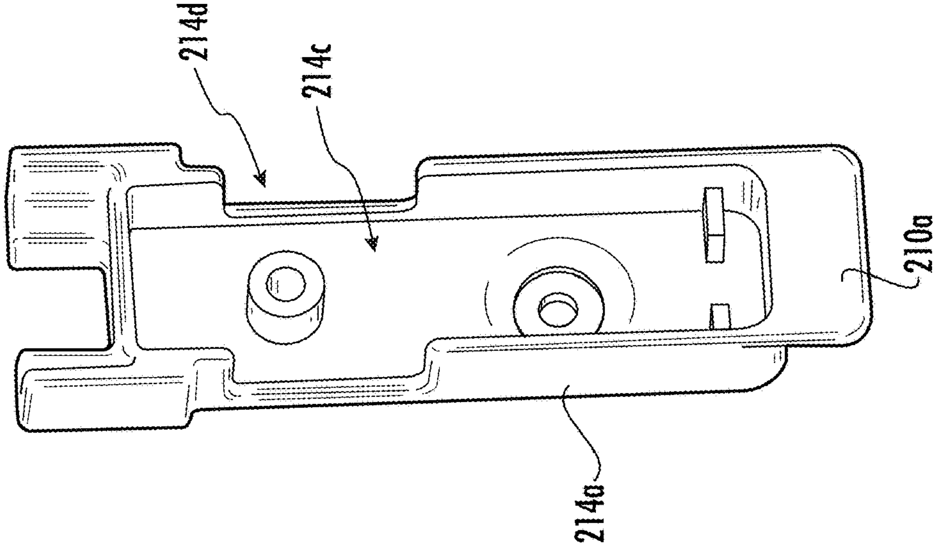
FIG. 12 shows a perspective view of a first portion of the housing of the seat bight coupler of FIG. 11.
Figure 13:
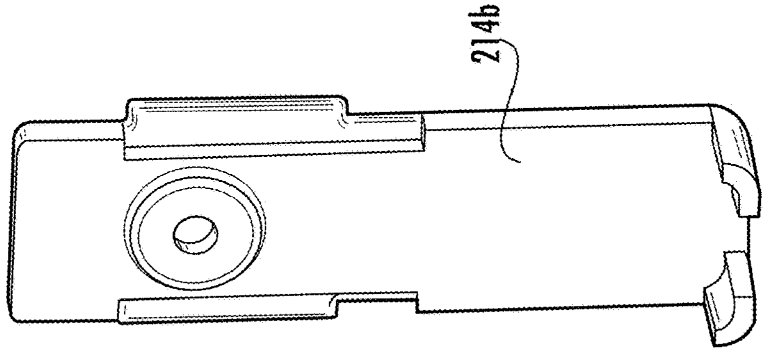
FIG. 13 shows a perspective view of a second portion of the housing of the seat bight coupler of FIG. 11.
Figure 14:
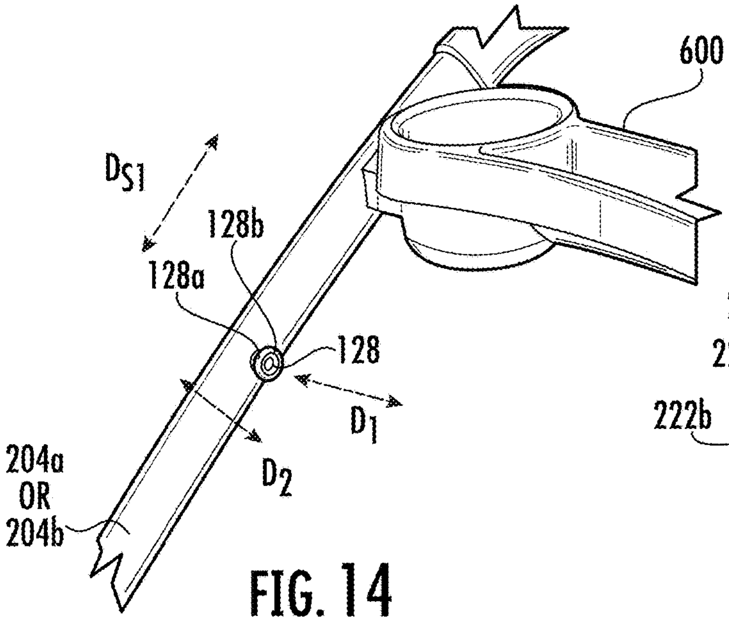
FIG. 14 shows a perspective view of a portion of a handle of the carriage frame of FIG. 2, the portion including an upper handle coupler configured to couple to a sidewall of the soft goods seat.
Figure 15:
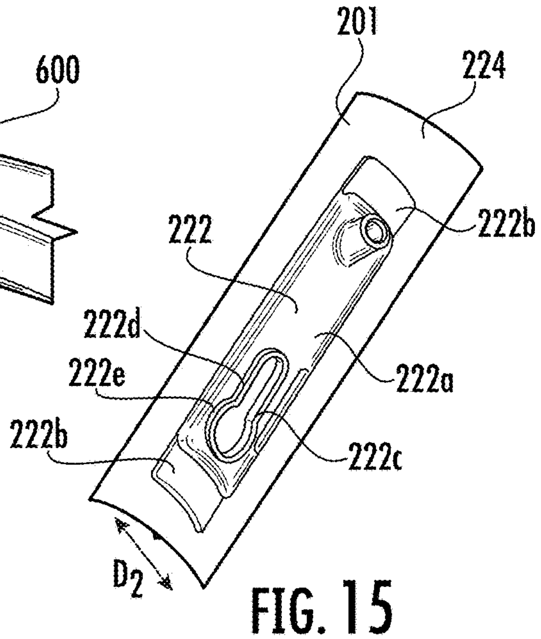
FIG. 15 shows a perspective view of an upper handle coupler of the soft goods seat attached to a sidewall of the soft goods seat, the upper handle coupler being configured to couple to the upper handle coupler of FIG. 14.

Turning to FIGS. 11 to 13, the leg coupler 210 includes a housing 214 and a shuttle 216 disposed in the housing 214. The shuttle 216 can carry the movable protrusion 210*b*. The shuttle 216 is translatable relative to the housing 214 along the select direction $D_S$ (see FIG. 9) so as to retract the movable protrusion 210*b* at least partially into the housing 214 and extend the movable protrusion 210*b* out of the housing 214. The housing 214 can carry the rigid protrusion 210*b*. In some examples, the housing 214 includes a first housing part 214*a* and a second housing part 214*b*. One or both of the first housing part 214*a* and the second housing part 214*b* defines a recess 214*c* that is configured to receive the shuttle 216 therein. The other of the first and second housing parts 214*a* and 214*b* can enclose the recess 214*c* to trap the shuttle 216 between the first and second housing parts 214*a* and 214*b*. In some examples, the first housing part 214*a* defines the recess 214*c* and can carry the rigid protrusion 210*a*. The leg coupler 210 includes a biasing member 218, such as a spring or flexible member, that is configured to bias the shuttle 216 along the select direction $D_S$ towards an extended position. The leg coupler 210 includes an actuation surface 216*a* that is configured to be engaged by a user to move the shuttle 216, and hence the movable protrusion 210*b*, towards a retracted position. The housing 214 defines an opening 214*d* therein, and the actuator surface 216*a* can protrude outside of the opening 214*d* so as to be accessible by the user. As shown in FIG. 7, the strap 212(1), 212(2) is attached to the housing 214 of the leg coupler 210.

Referring to FIGS. 4 and 5, the soft goods seat assembly 200 includes leg pad coupler 220 that is configured to couple the leg pad 208 of the soft goods seat 201 to the leg panel 118. The child carriage 10 is configured such that, when the leg couplers 210(1), 210(2) are coupled to the carriage frame 100 and the leg pad 208 is coupled to the leg panel 118, the seat pan 204 of the soft goods seat 201 is tensioned sufficiently to support the weight of a child sitting on the seat pan 204. While the leg couplers 210(1), 210(2) are coupled to the carriage frame 100 and the leg pad 208 is coupled to the leg panel 118, the soft goods seat 201 is stretched over the front support edge 119 of the carriage frame 100, thereby tensioning the seat pan 204, which is suspended between the front support edge 119 and the seat bight 204*a*.

Figure 26:
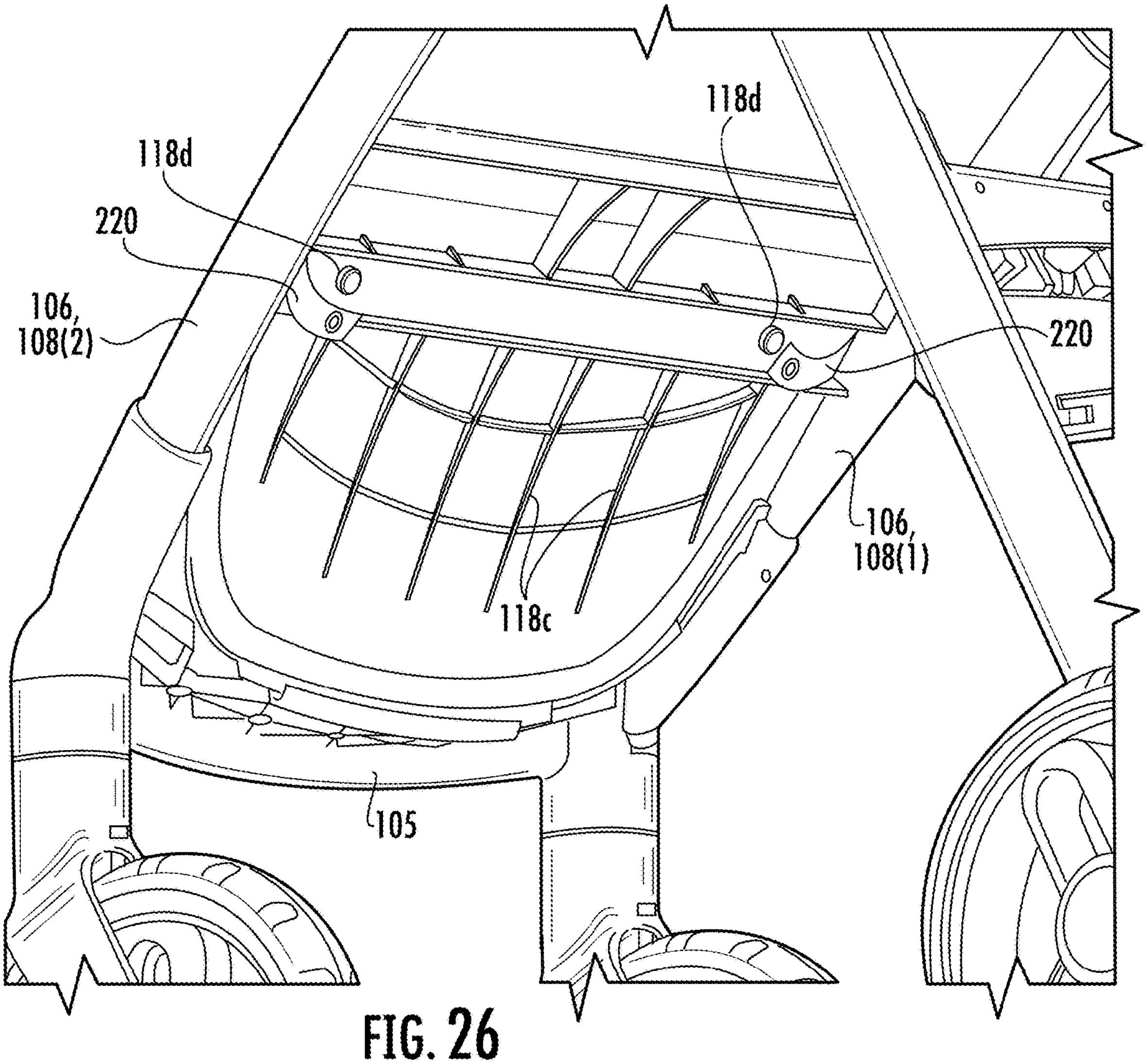
FIG. 26 shows another perspective view of the lower portion of the carriage frame of FIGS. 1, 2, and 24.

Referring now to FIGS. 4, 5, and 26 The leg pad coupler 220 is any suitable coupler that can resist tension applied to the leg pad coupler 220 when a child is seated on the seat pan 204. In one example, the leg panel 118 includes opening 118*e* therethrough, and leg panel coupler 118*d* disposed on an inner side of the leg panel 118. The leg pad coupler 220 includes strap that is configured to extend through the opening 118*e* of the leg panel 118 and couple to the leg panel coupler 118*d* on the inner side of the leg panel 118. In one example, the leg panel coupler 118*d* includes a post or socket of a snap, and the strap of the leg pad coupler 220 includes another of the post and socket of the snap. It will be understood, however, that the leg pad coupler 220 and the leg panel coupler 118*d* is any suitable coupler.

Turning to the attachment of the soft goods seat assembly 200. The soft goods seat assembly 200 includes a first upper handle coupler 222(1) and a second upper handle coupler 222(2) (both labeled in FIG. 3). Note that the second upper handle coupler 222(2) is a substantial mirror image of the first upper handle coupler 222(1). The first upper handle coupler 222(1) is disposed at the first sidewall 206(1) of the soft goods seat 201, and the second upper handle coupler 222(2) is disposed at the second sidewall 206(2) of the soft goods seat 201. The first upper handle coupler 222(1) is configured to attach the first sidewall 206(1) of the soft goods seat 201 to the first handle portion 104*a*, and the second upper handle coupler 222(2) is configured to attach the second sidewall 206(2) of the soft goods seat 201 to the second handle portion 104*b*.

FIGS. 3 and 14-17 show where the first and second handle portions 104*a* and 104*b* can each include an upper handle coupler 128(1), 128(2) that is configured to engage a corresponding upper handle coupler 222(1), 222(2) of the soft goods seat assembly 200. The upper handle couplers 222(1), 222(2), 128(1), 128(2) can be any suitable couplers that can attach the first and second sidewalls 206(1) and 206(2) to the first and second handle portions 104*a* and 104*b*, respectively. For example, each of the upper handle couplers 222(1) and 222(2) can include one of a protrusion and an opening, and the handle 104 includes another of a protrusion and an opening that is configured to engage the one of the protrusion and the opening so as to couple the upper handle coupler 222(1), 222(2) to the handle 104. The upper handle couplers 128(1), 128(2) are rigidly attached to the carriage frame 100 such that movement of the handle 104 causes a corresponding movement of the upper handle couplers 128(1), 128(2). Further, the upper handle couplers 222(1), 222(2) is configured to rigidly attach to the upper handle couplers 128(1), 128(2) such that movement of the handle 104 causes a corresponding movement of the upper handle couplers 222(1), 222(2).

FIGS. 1, 3 and 14 to 17 show one specific example of upper handle couplers 128 and 222 that is used to implement the upper handle couplers 128(1), 128(2), 222(1) and 222(2). The upper handle coupler 222 is formed from a polymer, such as a plastic, or another suitably rigid material.

The upper handle coupler 222 is attached to one of the first and second sidewalls 206(1), 206(2) of the soft goods seat 201. For example, the coupler 222 is attached to the sidewall 206(1), 206(2) by stitching, rivet, or another suitable fastener. In some examples, the coupler 222 can include a main body 222*a* and tab 222*b* that extends from the main body 222*a*, where the tab 222*b* has a thickness that is less than a thickness of the main body 222*a* such that the tab 222*b* is sewn to the sidewall 206(1), 206(2). In some examples, each sidewall 206(1), 206(2) can include a webbing 224 that extends thereon along a select direction $D_{S1}$, and the coupler 222 is attached to the webbing 224. The tab 222*b* includes first and second tabs 222*b* that extend from opposing ends of the main body 222*a* along a select direction $D_{S1}$. The select direction $D_{S1}$ is aligned with an axis of the handle 104, such as an axis of one of the first and second portions 104*a*, 104*b* of the handle 104.

The upper handle coupler 128 of the carriage frame 100 includes an enlarged head 128 b that extends from a neck 128 a. The head 128 b and neck 128 a extend from one of the first and second portions 104 a, 104 b of the handle 104 along a first direction D1, such as an inward direction. The neck 128 a extends from one of the first and second portions 104 a, 104 b of the handle 104 along the first direction D1, and the head 128 b extends from the neck 128 a along the first direction D1. The head 128 b can have a cross-sectional dimension along a second direction D2, perpendicular to the first direction D1, that is greater than a cross-sectional dimension of the neck 128 a along the second direction D2. In some examples, the head 128 b can have a cross-sectional shape in a plane perpendicular to the first direction D1 that is circular, although the head 128 b can have other cross-sectional shapes.

The upper handle coupler 222 defines an opening 222 c that extends therethrough along the first direction D1. The opening 222 c can have a first portion 222 d and a second portion 222 e that is spaced from the first portion 222 along the select direction DS1. The first portion 222 d can have a cross-sectional dimension along the second direction D2 that is less than a cross-sectional dimension of the second portion 222 d along the second direction D2. The first portion 222 d can have a cross-sectional dimension along the second direction D2 that is less than a cross-sectional dimension of the head 128 b along the second direction D2 but greater than a cross-sectional dimension of the neck 128 a along the second direction D2. The second portion 222 e can have a cross-sectional dimension along the second direction D2 that is greater than a cross-sectional dimension of the head 128 b along the second direction D2. Accordingly, the head 128 b is configured to be received through the second portion 222 e, and upper handle coupler 222 is translated along the select direction DS1 (such as downwards along the select direction DS1) until the neck 128 a is disposed in the first portion 222 d and the upper handle coupler 222 is trapped between the head 128 b and one of the first and second portions 104 a, 104 b of the handle 104.

Figure 16:
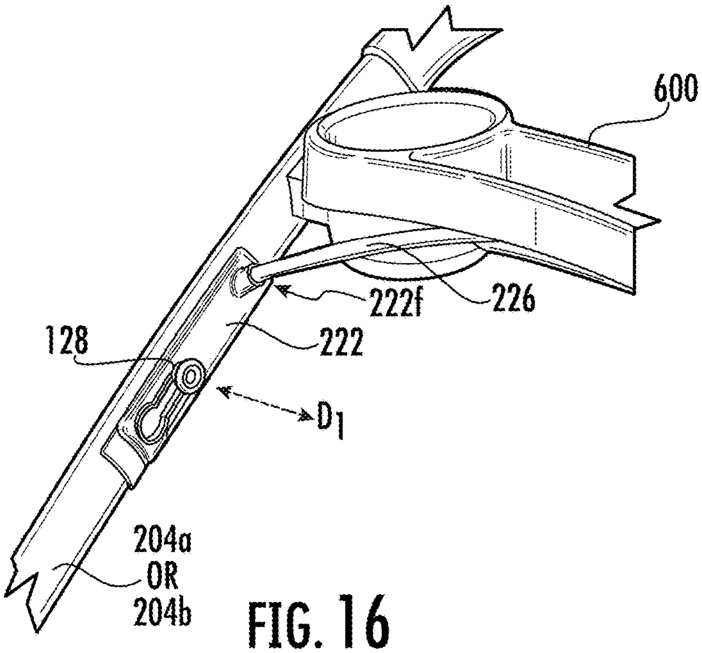
FIG. 16 shows a perspective view of the portion of the handle of FIG. 14 with the upper handle coupler of FIG. 15 attached to the upper handle coupler of the portion of the handle.
Figure 17:
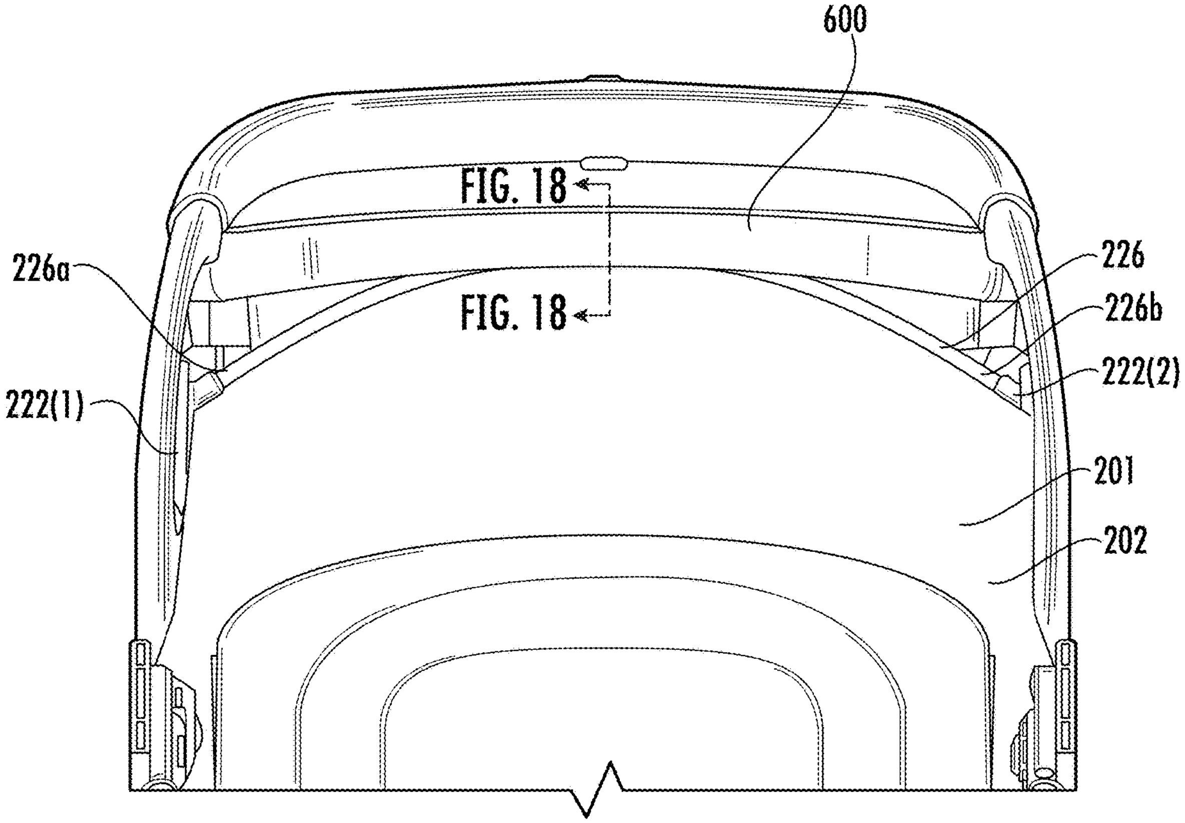
FIG. 17 shows a plan view of an upper portion of the child carriage of FIG. 1 according to one example, with the canopy removed to illustrate an attachment of the soft goods seat to a parent organizer.
Figure 18:
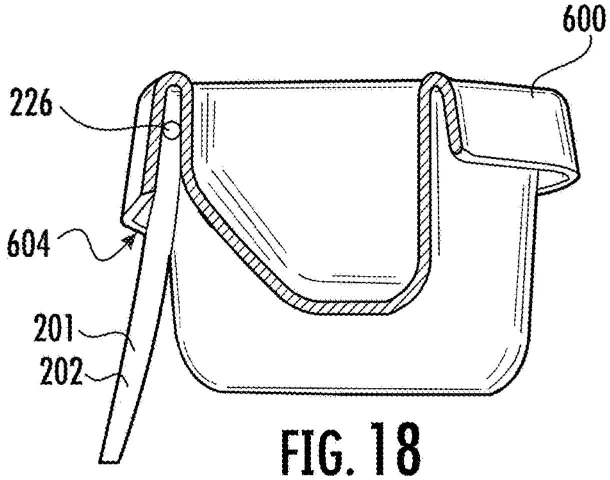
FIG. 18 shows a cross-sectional side view of the parent organizer of FIG. 17 and a portion of the soft goods seat received in the parent organizer.

With reference to FIGS. 16 to 18, in some examples, each upper handle coupler 222(1), 222(2) includes a stiffener opening 222*f* therein that is configured to receive a stiffener 226 attached to an upper end of the soft goods seat 201, such as to an upper end of the seatback 202 of the soft goods seat 201. The stiffener 226 is a rod that is configured to extend from the stiffener opening 222*f* of the first upper handle coupler 222(1) to the stiffener opening 222*f* of the second upper handle coupler 222(2). The stiffener 226 is attached to the soft goods seat 201 by, for example, receiving the stiffener 226 in a fabric tunnel of the soft goods seat 201. The stiffener is flexible, and is formed from a polymer (e.g., a plastic), a metal wire, or any suitable flexible material. The stiffener 226 can have a first end 226*a* that is received in the stiffener opening 222*f* of the first upper handle coupler 222(1), and a second end 226*b* that is received in the stiffener opening 222*f* of the second upper handle coupler 222(2). At least the middle portion 226*c* of the stiffener 226 is received in a recess 604 defined in an underside of the caregiver organizer 600. In some examples, the stiffener 226 is bent such that a middle portion 226*c* of the stiffener 226 is disposed above the first and second ends 226*a* and 226*b*. Thus, the middle portion 226*c* is biased upwards into the recess 604 so as to retain the middle portion 226*c* in the recess 604.

Figure 19:
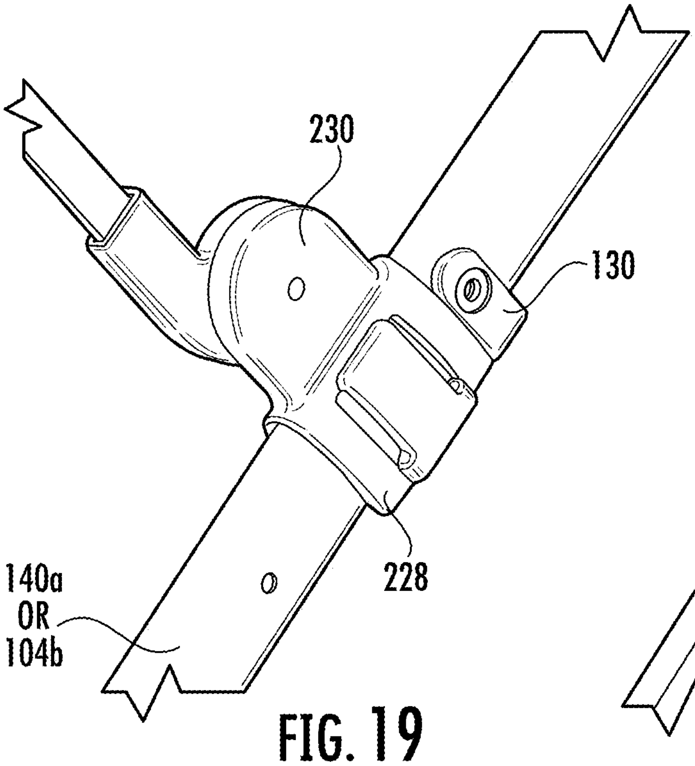
FIG. 19 shows a perspective view of a portion of a handle of the carriage frame of FIG. 2, the portion having a lower sidewall coupler of the soft goods seat coupled thereto.
Figure 20:
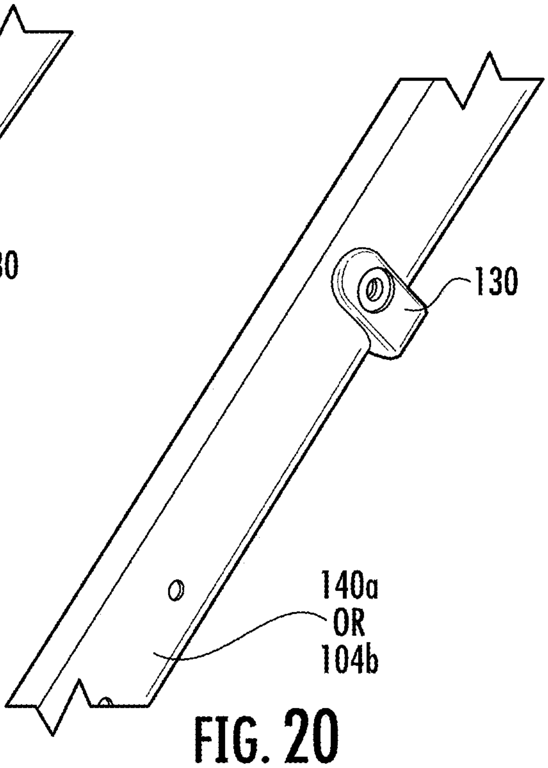
FIG. 20 shows a perspective view of the portion of the handle of FIG. 19, with the lower sidewall coupler removed.
Figure 21:
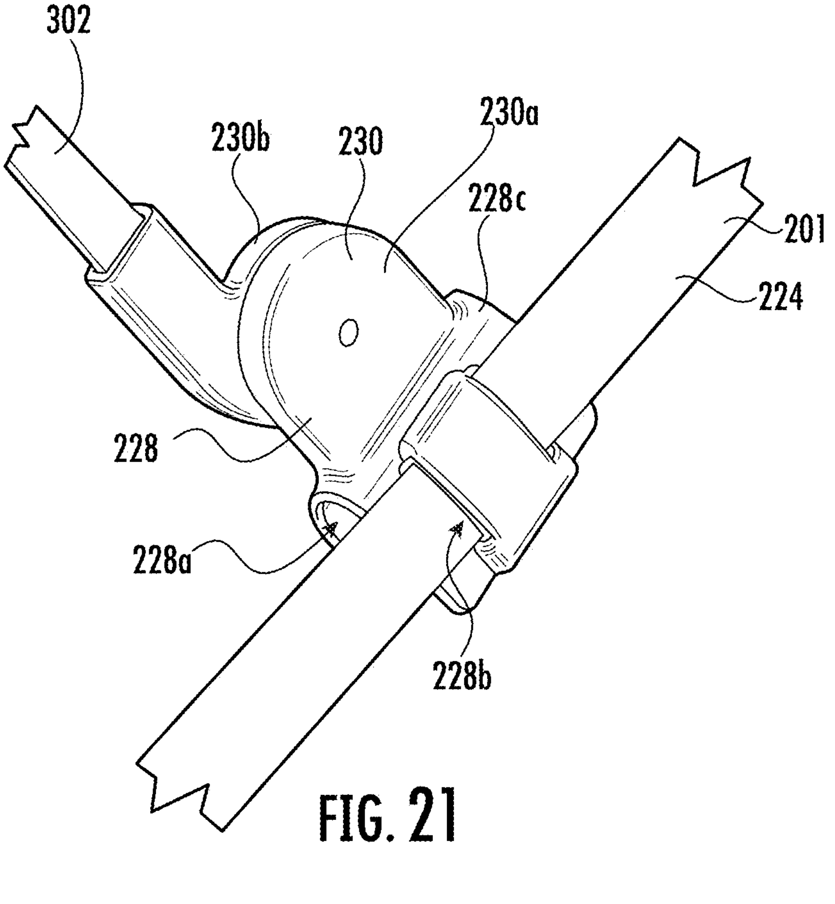
FIG. 21 shows a perspective view of the lower sidewall coupler attached to a sidewall of the soft goods seat.

The soft goods seat assembly 200 includes a first lower sidewall coupler 228(1) and a second lower sidewall coupler 228(2) (both labeled in FIG. 2). Note that the second lower sidewall coupler 228(2) is a mirror image of the first lower sidewall coupler 228(1). Turning to FIGS. 19 to 21, the first lower sidewall coupler 228(1) is disposed at the first sidewall 206(1) of the soft goods seat 201, and the second lower sidewall coupler 228(2) is disposed at the second sidewall 206(2) of the soft goods seat 201. The first lower sidewall coupler 228(1) is configured to attach the first sidewall 206(1) of the soft goods seat 201 to the first handle portion 104*a*, and the second lower sidewall coupler 228(2) is configured to attach the second sidewall 206(2) of the soft goods seat 201 to the second handle portion 104*b*. The first lower sidewall coupler 228(1) is configured to couple to the first handle portion 104*a* below the first upper handle coupler 222(1), and the second lower sidewall coupler 228(2) is configured to couple to the second handle portion 104*a* below the second upper handle coupler 222(2). The first and second handle portions 104*a* and 104*b* can each comprise a stop 130(1), 130(2) that is configured to engage a corresponding lower sidewall coupler 228(1), 228(2) of the soft goods seat assembly 200 to prevent the corresponding lower sidewall coupler 228(1), 228(2) from translating up the handle 104. The lower sidewall couplers 228(1), 228(2) is any suitable couplers that can attach the first and second sidewalls 206(1) and 206(2) to the first and second handle portions 104*a* and 104*b*, respectively. For example, each of the lower sidewall couplers 228(1) and 228(2) includes a clip that clips onto one of the first and second handle portions 104*a* and 104*b*. The lower sidewall couplers 228(1), 228(2) is configured to rigidly attach to the first and second handle portions 104*a* and 104*b* such that movement of the handle 104 causes a corresponding movement of the lower sidewall couplers 228(1), 228(2).

FIGS. 19 to 21 show one specific example of a lower sidewall coupler 228 that is used to implement the lower sidewall couplers 228(1) and 228(2), and a stop 130 that is used to implement the stops 130(1) and 130(2). The lower sidewall coupler 228 is formed from a polymer, such as a plastic, or another suitably rigid material. Similarly, the stop 130 is formed from a polymer, such as a plastic, or another suitably rigid material. The stop is rigidly and fixedly attached to one of the first and second handle portions 104*a* and 104*b*. For example, the stop 130 is fixed to the one of the first and second handle portions 104*a* and 104*b* by a rivet, screw, or other suitable fastener.

The lower sidewall coupler 228 can have a body 228 c that defines a recess 228 a therein that is configured to receive one of the first and second handle portions 104 a and 104 b so as to attach to the one of the first and second handle portions 104 a and 104 b. The lower sidewall coupler 228 is configured to be attached to the one of the first and second handle portions 104 a and 104 b below the stop 130 so that the stop 130 creates an interference that prevents the lower sidewall coupler 228 from translating up the one of the first and second handle portions 104 a, 104 b. The lower sidewall coupler 228 is attached to one of the first and second sidewalls 206(1), 206(2) of the soft goods seat 201. For example, the lower sidewall coupler 228 is attached to the sidewall 206(1), 206(2) by stitching, rivet, screw, or another suitable fastener. The lower sidewall coupler 228 is fixedly coupled to the one of the first and second sidewalls 206(1), 206(2) such that movement of the lower sidewall coupler 228 causes a corresponding movement of the one of the sidewalls 206(1), 206(2). The lower sidewall coupler 228 is fixedly attached to the one of the first and second sidewalls 206(1), 206(2) of the soft goods seat 201 such that removal of the lower sidewall coupler 228 from a corresponding one of the first and second handle portions 104 a and 104 b causes removal of at least a portion of the one of the first and second sidewalls 206(1), 206(2) from the corresponding one of the first and second handle portions 104 a and 104 b. In some examples, the soft goods seat 201 can include a webbing 224 attached to each of the first and second sidewalls 206(1), 206(2) that extends thereon along a select direction DS1, and the lower sidewall coupler 228 is attached to the webbing 224. For example, the lower sidewall coupler 228 defines a tunnel 228 b, and the webbing 224 extends through the tunnel 228 b and be attached to a corresponding one of the first and second sidewalls 206(1), 206(2) on either side of the tunnel 228 b.

In some examples, the lower sidewall coupler 228 includes a joint 230 that is attached to a bow 302 of the canopy 300. In some examples, the joint 230 can allow the bow 302 of the canopy 300 to rotate relative to the body 228*c* of the lower sidewall coupler 228. The joint 230 can have a first portion 230*a* that is fixedly attached to the body 228*c* of the lower sidewall coupler 228. For example, the first portion 230*a* of the joint 230 is integral and monolithic with the body 228*c* of the lower sidewall coupler 228. The joint 230 can have a second portion 230*b* that is configured to rotate relative to the first portion 230*a*. The bow 302 is attached to the second portion 230*b* such that rotation of the second portion 230*b* causes rotation of the bow 302.

The soft goods seat assembly 200 is configured such that each sidewall 206(1), 206(2) is installed by (1) attaching a corresponding one of the upper handle couplers 222(1) to a corresponding one of the first and second handle portions 104*a*, 104*b*, (2) pulling the sidewall 206(1), 206(2) down so as to apply tension to the sidewall 206(1), 206(2), and (3) attaching a corresponding one of the lower sidewall couplers 228(1), 228(2) to a corresponding one of the first and second handle portions 104*a*, 104*b* below a corresponding one of the stops 130(1), 130(2) while the sidewall 206(1), 206(2) is tensioned so as to maintain tension in the sidewall 206(1), 206(2). The tension in the sidewall 206(1), 206(2) can maintain the sidewall 206(1), 206(2) in tight relation with the one of the first and second handle portions 104*a*, 104*b*. In some examples, the soft goods seat assembly 200 is configured such that each sidewall 206(1), 206(2) cannot be installed by attaching a corresponding one of the upper handle couplers 222(1) to a corresponding one of the first and second handle portions 104*a*, 104*b* after attaching a corresponding one of the lower sidewall couplers 228(1), 228(2) to a corresponding one of the first and second handle portions 104*a*, 104*b* below a corresponding one of the stops 130(1), 130(2).

Each sidewall 206(1), 206(2) (e.g., webbing 224) can have a length from the stop 130 to the second portion 222*e* of the opening 222*c* that is less than a length from the stop 130 to the upper handle coupler 128. Accordingly, when the lower sidewall coupler is coupled below the stop 130, the length of the sidewall 206(1), 206(2) (e.g., webbing 224) restricts the coupler 222 from being translated upwards along the handle portion 104*a*, 104*b* to a position where the coupler 222 is decoupled from the coupler 128.

A second example of how the soft goods seat assembly 200 is removably coupled to the carriage 100' will now be described in relation to FIGS. 24 to 38. The soft goods seat assembly 200 and carriage frame 100' includes a plurality of couplers to removably couple the soft goods seat assembly 200 to the carriage 100'. Similar to Example 1 discussed above, the soft goods seat assembly 200 includes a first sidewall coupler 228(1) and a second sidewall coupler 228(2) (both labeled in FIG. 24). Further, the first and second handle portions 104*a* and 104*b* of the carriage 100' can each comprise a stop 130(1), 130(2) that is configured to engage a corresponding sidewall coupler 228(1), 228(2) of the soft goods seat assembly 200 to prevent the corresponding sidewall coupler 228(1), 228(2) from translating up the handle 104. The sidewall couplers 228(1) and 228(2) and the stops 130(1) and 130(2) is implemented as discussed above.

Figure 25:
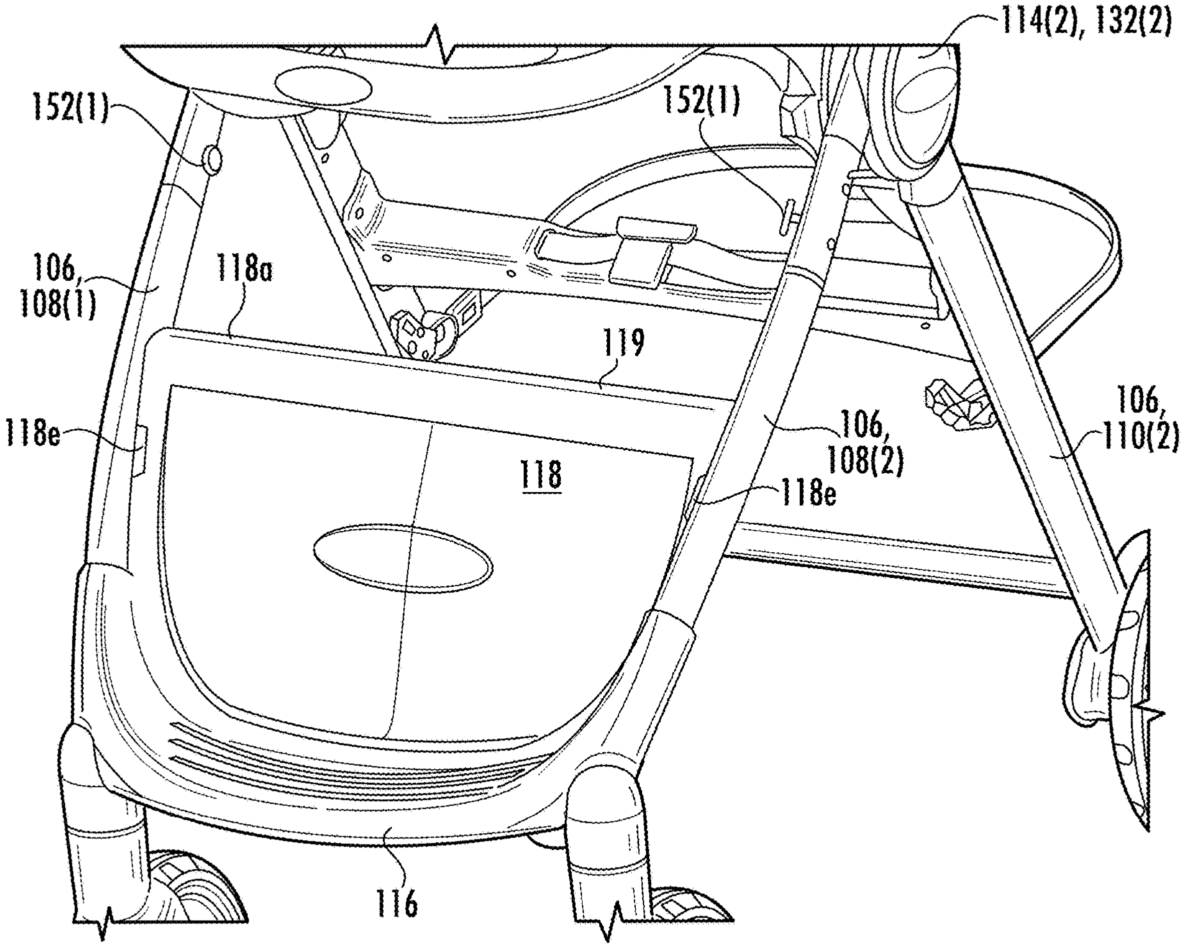
FIG. 25 shows a perspective view of a lower portion of the carriage frame of FIG. 24.

Turning now to FIGS. 25 and 26, the carriage 100' includes leg pad coupler 220 that is configured to couple the leg pad 208 of the soft goods seat 201 to the leg panel 118. The child carriage 10 is configured such that, when the soft goods seat assembly 200 is coupled to the carriage frame 100', the seat pan 204 of the soft goods seat 201 is tensioned sufficiently to support the weight of a child sitting on the seat pan 204. While the leg couplers 210(1), 210(2) are coupled to the carriage frame 100 and the leg pad 208 is coupled to the leg panel 118, the soft goods seat 201 is stretched over the front support edge 119 of the carriage frame 100, thereby tensioning the seat pan 204.

The leg pad coupler 220 is any suitable coupler that can resist tension applied to the leg pad coupler 220 when a child is seated on the seat pan 204. In one example, the leg panel 118 includes opening 118*e* therethrough, and leg panel coupler 118*d* disposed on an inner side of the leg panel 118. The leg pad coupler 220 includes strap that is configured to extend through the opening 118*e* of the leg panel 118 and couple to the leg panel coupler 118*d* on the inner side of the leg panel 118. In one example, the leg panel coupler 118*d* includes a post or socket of a snap, and the strap of the leg pad coupler 220 includes another of the post and socket of the snap. It will be understood, however, that the leg pad coupler 220 and the leg panel coupler 118*d* is any suitable coupler.

Figure 30:
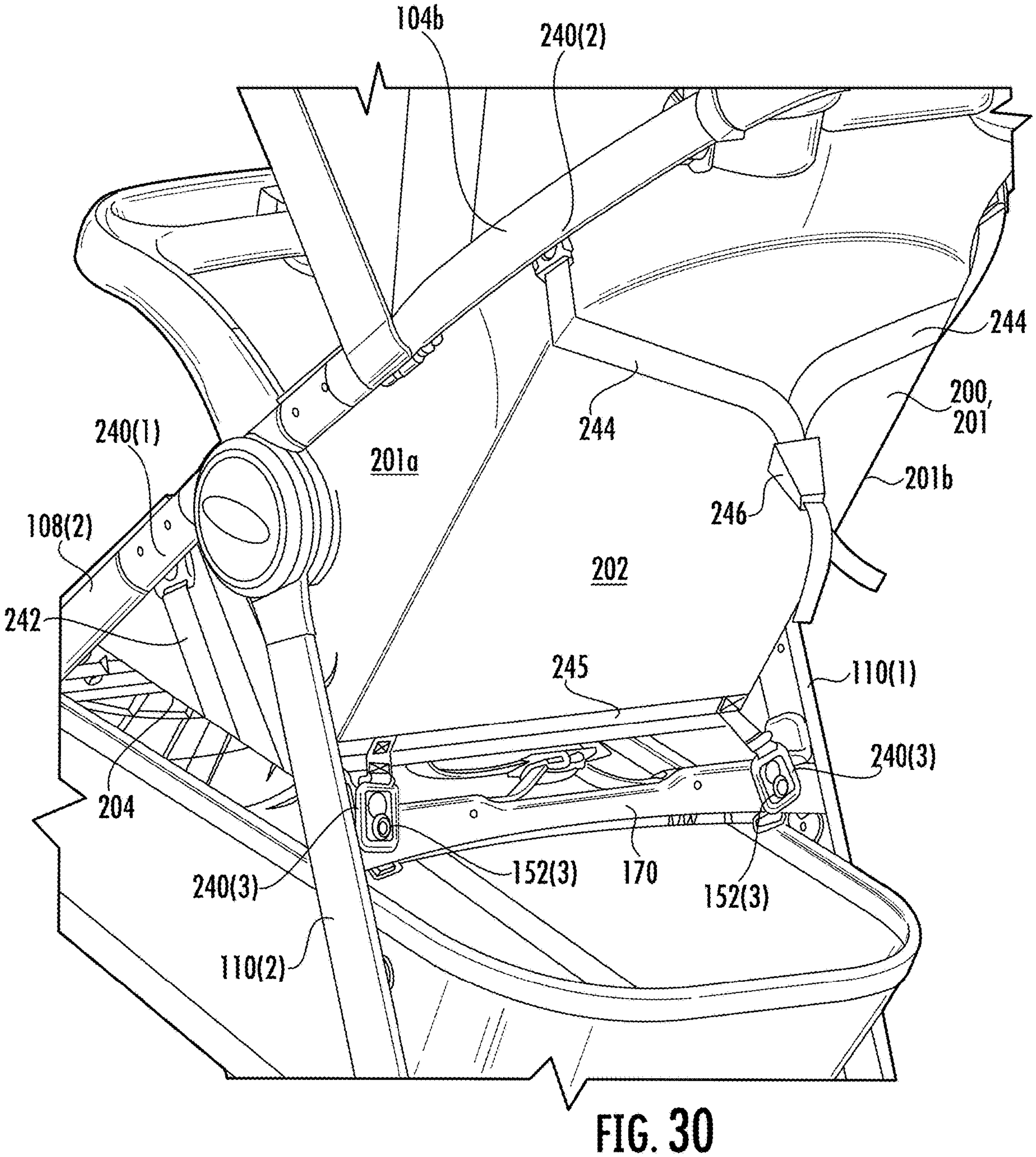
FIG. 30 shows a perspective view of a rear portion of the carriage of FIG. 24 according to the second example.

Referring to FIG. 30, the soft goods seat assembly 200 includes a pair of leg couplers 240(1) fixedly attached to the soft goods seat 201. Each leg coupler 240(1) is configured to removably couple a side 201*a*, 201*b* of the soft goods seat 201 to a leg of the carriage frame 100'. For example, the pair of leg couplers 240(1) is configured to removably couple the first and second sides 201*a*, 201*b* of the soft goods seat 201 to the first and second front legs 108(1) and 108(2), respectively. The leg couplers 240(1) is fixedly attached to the soft goods seat 201. The leg couplers 240(1) is spaced from one another along the lateral direction A. For instance, the leg couplers 240(1) is disposed at first and second sides 201*a* and 201*b* of the soft goods seat 201.

In some examples, the soft goods seat assembly 200 includes support strap 242 that is attached to the soft goods seat 201 along the seat pan 204 and/or the seatback 202. The support strap 242 is, for example, a textile webbing, rope, or cord. The support strap 242 extends from the first side 201*a* of the soft goods seat 201 to the second side 201*b* of the soft goods seat 201. The first and second sides 201*a* and 201*b* is spaced from one another along the lateral direction A. The support strap 242 is attached to the soft goods seat 201 using any suitable technique, such as a sewing or passing the strap through a fabric tunnel in the soft goods seat 201. The support strap 242 is attached to the soft goods seat 201 as the strap 242 extends along the soft goods seat 201 between the first and second sides 201*a* and 201*b*. For instance, the soft goods seat 201 can have a width from the first side 201*a* to the second side 201*b*, and the support strap 242 is attached to the soft goods seat 201 along at least 50% of the width or as along an entirety of the width.

The support strap 242 extends along the seat pan 204 and/or seatback 202 along the lateral direction A, and can optionally extend along the first and second sidewalls 206(1) and 206(2). The support strap 242 is attached to the pair of leg couplers 240(1). For example, each support strap 242 is fixedly attached to the pair of leg couplers 240(1) by sewing or by a rivet, screw, or another suitable fastener. The support strap 242 can have a fixed length between the first and second leg couplers 240(1). The fixed length is selected such that a desired tension is applied to each support strap 242 when the pair of leg couplers 240(1) are coupled to the carriage frame 100', without a need for the caregiver to adjust the tension applied to the support strap 242. In fact, the length of the support strap 242 is fixed such that the tension applied to the support strap 242 cannot be adjusted. Fixing the length of the support strap 242 can ensure that the soft goods seat 201 is easily and reliably installed, without concern of a caregiver failing to properly tension the support strap 242.

The support strap 242 is attached to the soft goods seat 201 under the seat pan 204 so as to provide structural support to the soft goods seat 201 underneath the seat pan 204. Thus, the support strap 242 is configured to provide structural support to resist movement of the seat pan 204 along the vertical direction V.

With reference to FIGS. 25 and 30, the leg couplers 240(1) are configured to removably couple to the carriage frame 100'. For example, each leg coupler 240(1) is configured to removably couple to a corresponding front leg 108(1), 108(2) of the carriage frame 100'. The carriage frame 100' includes a pair of leg couplers 152(1) (labeled in FIG. 25) that are configured to couple to the pair of leg couplers 240(1) of the soft goods seat assembly 200. The leg couplers 240(1) and 152(1) is any suitable couplers that can attach the soft goods seat 201 to the first and second front legs 108(1) and 108(2). For example, each of the leg couplers 240(1) of the soft goods seat assembly 200 includes one of a protrusion and an opening, and each corresponding leg coupler 152(1) of the carriage frame 100' includes another of a protrusion and an opening that is configured to engage the one of the protrusion and the opening so as to couple the leg coupler 240(1) to one of the first and second front legs 108(1) and 108(2). The leg couplers 152(1) is rigidly attached to the carriage frame 100' such that movement of the first and second front legs 108(1) and 108(2) causes a corresponding movement of the leg couplers 152(1). Further, the leg couplers 240(1) of the soft goods seating assembly 200 is configured to rigidly attach to the leg couplers 152(1) such that movement of the first and second front legs 108(1) and 108(2) causes a corresponding movement of the leg couplers 240(1) of the soft goods seating assembly 200.

Referring to FIG. 30, the soft goods seat assembly 200 includes a pair of handle couplers 240(2) fixedly attached to the soft goods seat 201. Each handle coupler 240(2) is configured to removably couple a side 201*a*, 201*b* of the soft goods seat 201 to one of the first and second handle portions 104*a* and 104*b*. For example, the pair of handle couplers 240(2) is configured to removably couple the first and second sides 201*a*, 201*b* of the soft goods seat 201 to the first and second handle portions 104*a* and 104*b*, respectively. The handle couplers 240(2) is fixedly attached to the soft goods seat 201. The handle couplers 240(2) is spaced from one another along the lateral direction A. For instance, the handle couplers 240(2) is disposed at first and second sides 201*a* and 201*b* of the soft goods seat 201.

In some examples, the soft goods seat assembly 200 includes a pair of recline straps 244 that are attached to the soft goods seat 201 along the seatback 202. The recline straps 244 is, for example, a textile webbing, rope, or cord. A first of the recline straps 244 extends from the first side 201*a* of the soft goods seat 201 towards a center of the seatback 202, and a second of the recline straps 244 extends from the second side 201*b* of the soft goods seat 201 towards the center of the seatback 202. Each recline strap 244 is attached to the soft goods seat 201 using any suitable technique, such as a sewing or passing the strap through a fabric tunnel in the soft goods seat 201.

Each recline strap 244 extends along the seatback 202 along the lateral direction A and can optionally extend along one of the first and second sidewalls 206(1) and 206(2). Each recline strap 244 is attached to one of the handle couplers 240(2). For example, a first end of each recline strap 244 is fixedly attached to one of the handle couplers 240(2) by sewing or by a rivet, screw, or another suitable fastener. The carriage 10 includes a recline lock 246. A second end of each recline strap 244 is received through the recline lock 246. The recline lock 246 is configured to slide along the pair of recline straps 244 so as to adjust a length along each recline strap 244 from a corresponding one of the handle couplers 240(2) to the recline lock 246. Adjusting the length of each recline strap 244 can enable the seatback 244 to become more reclined or more inclined, and the recline lock 246 is selectively locked at different positions along the recline straps 244 to affix the seatback 244 in different recline positions. For example, the recline lock 246 is configured to slide up the pair of recline straps 244 so as to shorten the length, thereby causing the seatback 202 to become more inclined. Further, the recline lock 246 is configured to slide down the pair of recline straps 244 so as to increase the length, thereby allowing the seatback 202 to become more reclined.

Figure 29:
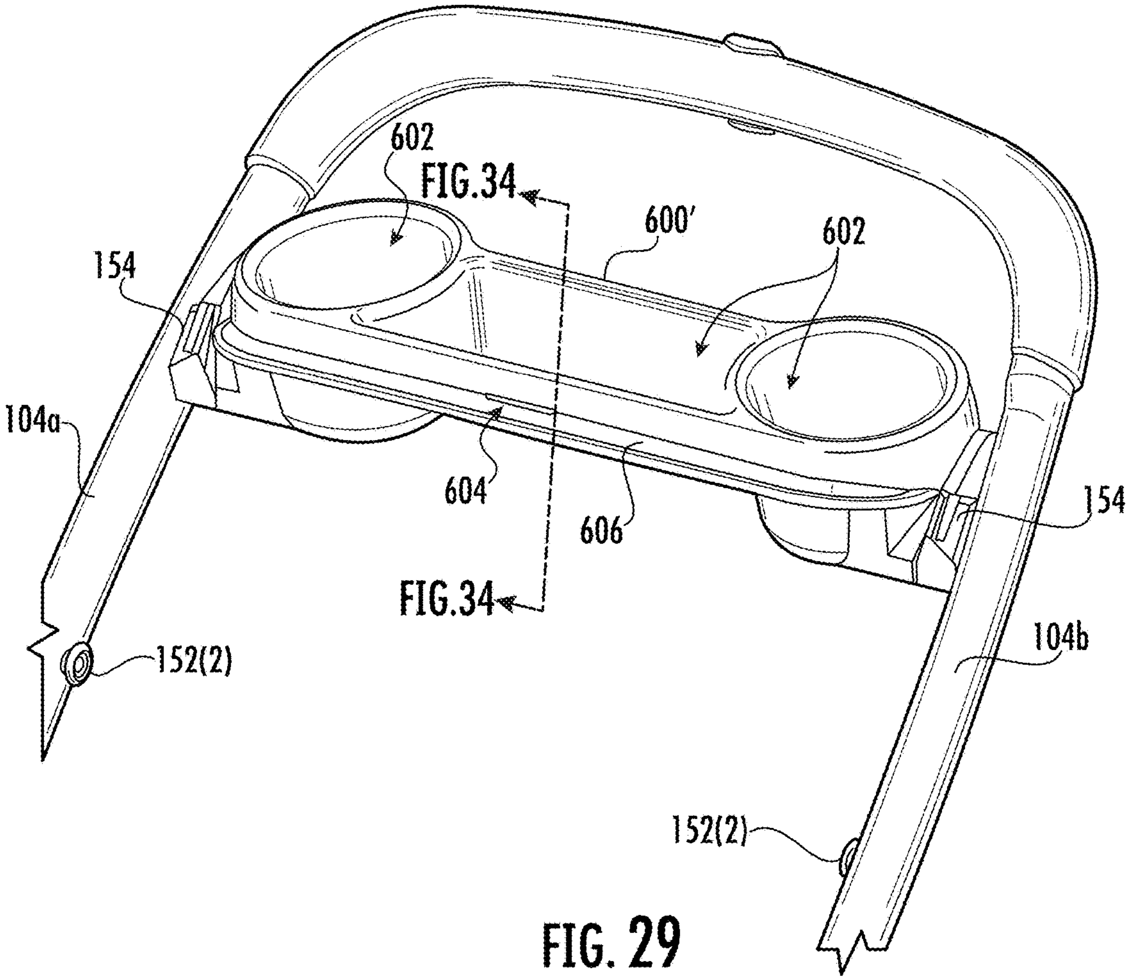
FIG. 29 shows a perspective view of a handle of the carriage frame of FIG. 24 according to the second example.

With reference to FIGS. 29 and 30, the handle couplers 240(2) are configured to removably couple to the carriage frame 100'. For example, each handle coupler 240(2) is configured to removably couple to a corresponding handle portion 104*a*. 104*b* of the carriage frame 100'. The carriage frame 100' includes a pair of handle couplers 152(2) (labeled in FIG. 29) that are configured to couple to the pair of handle couplers 240(2) of the soft goods seat assembly 200. The handle couplers 240(2) and 152(2) is any suitable couplers that can attach the soft goods seat 201 to the first and second handle portions 104*a* and 104*b*. For example, each of the handle couplers 240(2) of the soft goods seat assembly 200 includes one of a protrusion and an opening, and each corresponding handle coupler 152(2) of the carriage frame 100' includes another of a protrusion and an opening that is configured to engage the one of the protrusion and the opening so as to couple the handle coupler 240(2) to one of the first and second handle portions 104a and 104b. The handle couplers 152(2) is rigidly attached to the carriage frame 100' such that movement of the first and second handle portions 104a and 104b causes a corresponding movement of the handle couplers 152(2). Further, the handle couplers 240(2) of the soft goods seating assembly 200 is configured to rigidly attach to the handle couplers 152(2) such that movement of the first and second handle portions 104a and 104b causes a corresponding movement of the handle couplers 240(2) of the soft goods seating assembly 200.

Referring to FIG. 30, the soft goods seat assembly 200 includes a pair of seat bight couplers 240(3) fixedly attached to the soft goods seat 201. Each seat bight coupler 240(3) is configured to removably couple the seat bight 204a of the soft goods seat 201 to the carriage frame 100', such as to the crosspiece 170. For example, the pair of seat bight couplers 240(3) is configured to removably couple first and second sides of the soft goods seat 201 to first and second sides, respectively, of the crosspiece 170. The seat bight couplers 240(3) is fixedly attached to the soft goods seat 201. The seat bight couplers 240(3) is spaced from one another along the lateral direction A. For instance, the seat bight couplers 240(3) is disposed adjacent to the first and second sides 201a and 201b of the soft goods seat 201.

In some examples, the soft goods seat assembly 200 includes support strap 245 that is attached to the soft goods seat 201 along the seat pan 204 and/or the seatback 202, adjacent to the seat bight 204a. The support strap 245 is, for example, a textile webbing, rope, or cord. The support strap 245 extends from the first side 201a of the soft goods seat 201 to the second side 201b of the soft goods seat 201. The support strap 245 is attached to the soft goods seat 201 using any suitable technique, such as a sewing or passing the strap through a fabric tunnel in the soft goods seat 201. The support strap 245 is attached to the soft goods seat 201 as the strap 245 extends along the soft goods seat 201 between the first and second sides 201a and 201b. For instance, the soft goods seat 201 can have a width from the first side 201a to the second side 201b, and the support strap 245 is attached to the soft goods seat 201 along at least 50% of the width, such as along 60% of the width, such as along at least 70% of the width, such as along 80% of the width, such as along at least 90% of the width, such as along an entirety of the width.

The support strap 245 extends along the seat pan 204 and/or seatback 202 along the lateral direction A. The support strap 245 is attached to the pair of seat bight couplers 240(3). For example, each support strap 245 is fixedly attached to the pair of seat bight couplers 240(3) by sewing or by a rivet, screw, or another suitable fastener. The support strap 245 can have a fixed length between the first and second seat bight couplers 240(3). The fixed length is selected such that a desired tension is applied to each support strap 245 when the pair of seat bight couplers 240(3) are coupled to the carriage frame 100', without a need for the caregiver to adjust the tension applied to the support strap 245. In fact, the length of the support strap 245 is fixed such that the tension applied to the support strap 245 cannot be adjusted. Fixing the length of the support strap 245 can ensure that the soft goods seat 201 is easily and reliably installed, without concern of a caregiver failing to properly tension the support strap 245.

The support strap 245 is attached to the soft goods seat 201 behind the seat back 202 so as to provide structural support to the soft goods seat 201 behind the seat back 202. Thus, the support strap 245 is configured to provide structural support to resist movement of the seat back 202 along the longitudinal direction L. In addition, or alternatively, the support strap 245 is attached to the soft goods seat 201 under the seat pan 204 so as to provide structural support to the soft goods seat 201 underneath the seat pan 204. Thus, the support strap 245 is configured to provide structural support to resist movement of the seat pan 204 along the vertical direction V.

Figure 36:
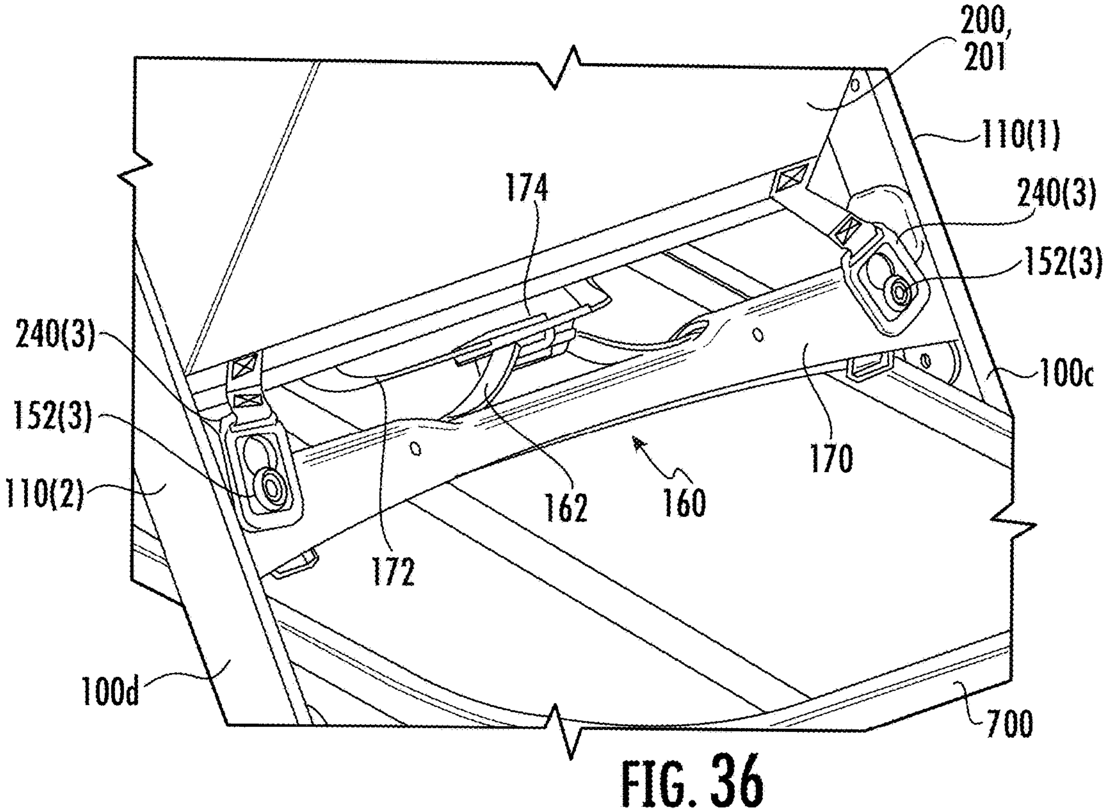
FIG. 36 shows a rear perspective view of the lower portion of the child carriage of FIG. 24.

With reference to FIGS. 30 and 36, the seat bight couplers 240(3) are configured to removably couple to the carriage frame 100'. For example, the carriage frame 100' includes a pair of seat bight couplers 152(3) that are configured to couple to the pair of seat bight couplers 240(3) of the soft goods seat assembly 200. The seat bight couplers 240(3) and 152(3) is any suitable couplers that can attach the soft goods seat 201 to the crosspiece 170. For example, each of the seat bight couplers 240(3) of the soft goods seat assembly 200 includes one of a protrusion and an opening, and each corresponding seat bight coupler 152(3) of the carriage frame 100' includes another of a protrusion and an opening that is configured to engage the one of the protrusion and the opening so as to couple the seat bight coupler 240(3) to the crosspiece 170. The seat bight couplers 152(3) is rigidly attached to the carriage frame 100' such that movement of the crosspiece 170 causes a corresponding movement of the seat bight couplers 152(3). Further, the seat bight couplers 240(3) of the soft goods seating assembly 200 is configured to rigidly attach to the seat bight couplers 152(3) such that movement of the crosspiece 170 causes a corresponding movement of the seat bight couplers 240(3) of the soft goods seating assembly 200.

Figure 27:
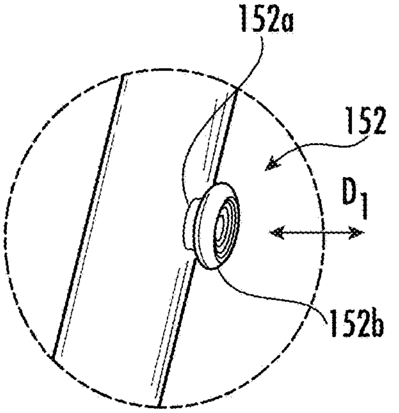
FIG. 27 shows a perspective view of a coupler of the carriage frame of FIG. 24 according to the second example.

FIG. 27 shows one example of a coupler 152 that is used to implement one or more of (i) each of the leg couplers 152(1) of the carriage frame 100', (ii) each of the handle couplers 152(2) of the carriage frame 100', or (iii) each of the seat bight couplers 155 of the carriage frame 100'. The coupler 152 of the carriage frame 100' includes a protrusion. The protrusion extends from one of the one of the first and second handle portions 104a or one of the first and second front legs 108(1) and 108(2) along a first direction D1, such as an inward direction. The protrusion includes a neck 152a and an enlarged head 152b that extends from the neck 152a. The neck 152a extends from the carriage frame 100' along the first direction D1, and the head 152b extends from the neck 152a along the first direction D1. The head 152a can have a cross-sectional dimension along a second direction D2, perpendicular to the first direction D1, that is greater than a cross-sectional dimension of the neck 152a along the second direction D2. In some examples, the head 152a can have a cross-sectional shape in a plane perpendicular to the first direction D1 that is circular, although the head 152a can have other cross-sectional shapes.

Figure 28:
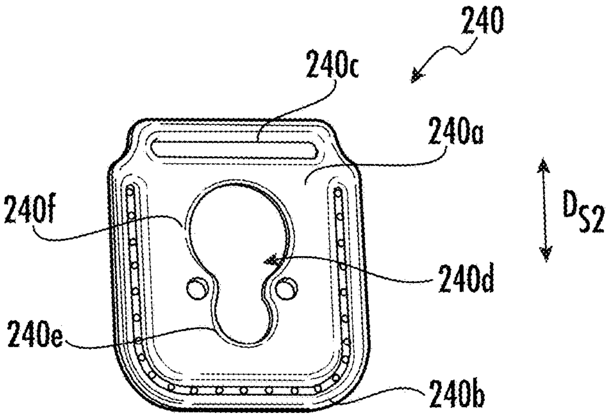
FIG. 28 shows a perspective view of a coupler of the soft goods seat assembly that is configured to be coupled to the coupler of FIG. 27.

FIG. 28 shows one example of a coupler 240 that is used to implement one or more of (i) each of the leg couplers 240(1) of the soft goods seating assembly 200, (ii) each of the handle couplers 240(2) of the soft goods seating assembly 200, or (iii) each of the seat bight couplers 240(3) of the soft goods seating assembly 200. The coupler 240 of the soft goods seat 201 is formed from a polymer, such as a plastic, or another suitable material. The coupler 240 is attached to the soft goods seat 201, such as to one of the first and second sidewalls 206(1), 206(2) of the soft goods seat 201. For example, the coupler 240 is attached to soft goods seat 201 by stitching, by rivet, or by another suitable fastener. In some examples, the coupler 240 can have a body 240a having at least a portion 240b thereof that has a thickness that is sewn to the soft goods seat 201. The body 240b a can have a planar shape. In some examples, the body 240*a* defines an opening 240*c* that is configured to receive a portion of the support strap 242 or a recline strap 244 therethrough so as to couple the strap to the coupler 240.

The body 240*a* can further define an opening 240*d* that extends therethrough along the first direction $D_1$. The opening 240*d* can have a keyhole shape. The opening 240*d* can have a first portion 240*e* and a second portion 240*f* that is spaced from the first portion 240*e* along a select direction $D_{S2}$. Preferably, the second direction $D_{S2}$ is a downward direction when implementing couplers 240(1) and 240(2), and is an upward direction when implementing couplers 240(3). The first portion 240*e* can have a cross-sectional dimension along the second direction $D_2$ that is less than a cross-sectional dimension of the second portion 240*f* along the second direction $D_2$. The first portion 240*e* can have a cross-sectional dimension along the second direction $D_2$ that is less than a cross-sectional dimension of the head 152*b* of the coupler 152 along the second direction $D_2$ but greater than a cross-sectional dimension of the neck 152*b* of the coupler 152 along the second direction $D_2$. The second portion 240*f* can have a cross-sectional dimension along the second direction $D_2$ that is greater than a cross-sectional dimension of the head 152*a* along the second direction $D_2$. Accordingly, the head 152*a* is configured to be received through the second portion 240*f*, and coupler 240 is translated along a select direction $D_{S1}$ (such as downwards along the select direction $D_{S2}$) until the neck 152*b* is disposed in the first portion 240*e* and the coupler 240 is trapped between the head 152*a* and one of the carriage frame 100'.

Figure 31:
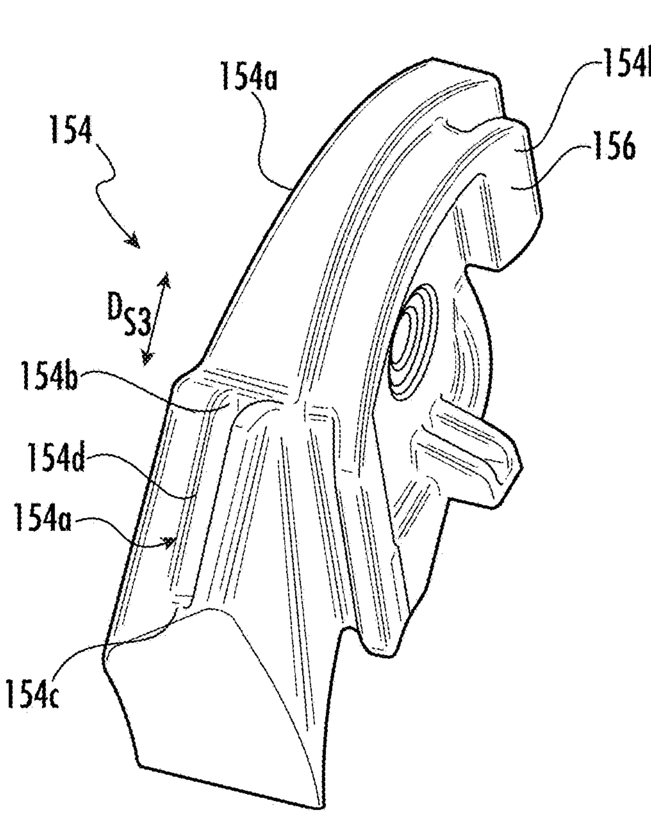
FIG. 31 shows a perspective view of an upper handle coupler of the carriage frame of FIG. 24.
Figure 32:
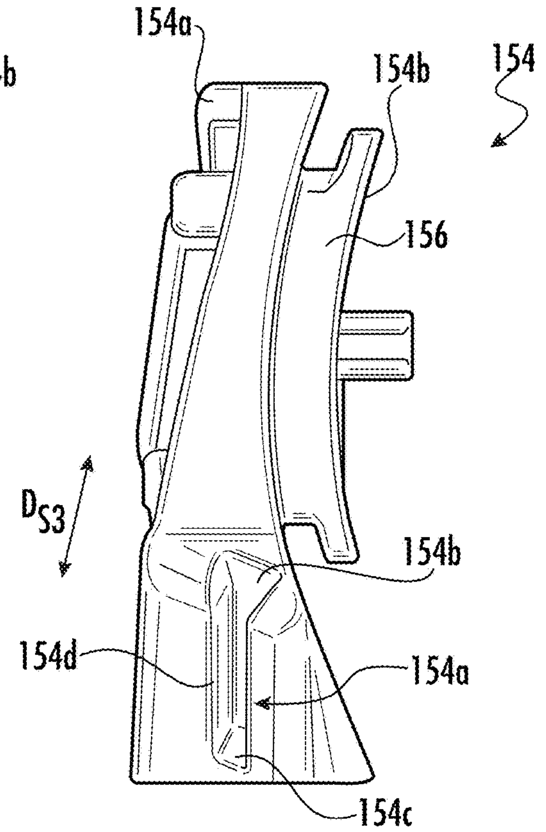
FIG. 32 shows a plan view of the upper handle coupler of FIG. 31.
Figure 33:
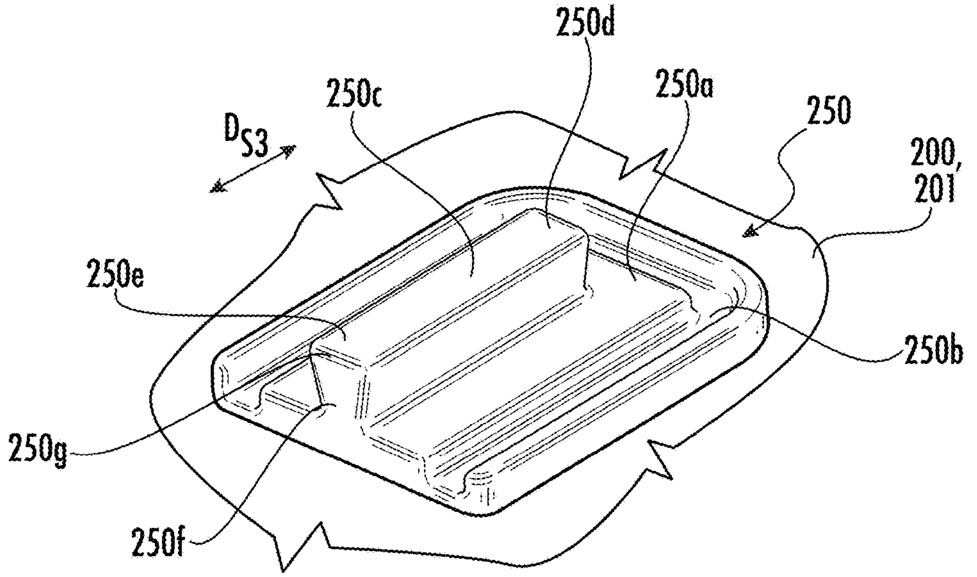
FIG. 33 shows a perspective view of an upper handle coupler of the soft goods seat assembly that is configured to be coupled to the upper handle coupler of FIG. 32.

Referring to FIGS. 29, 31, 32, and 33, the carriage frame 100' includes a pair of upper handle couplers 154, and the soft goods assembly 200 includes a corresponding pair of upper handle couplers 250) (labeled in FIG. 33). Each upper handle coupler 154 is configured to couple to a pair of upper handle couplers 250 of the soft goods seat assembly 200. The upper handle couplers 154 and 250 is any suitable couplers that can attach the soft goods seat 201 to the first and second handle portions 104*a* and 104*b*. For example, each of the upper handle couplers 250 of the soft goods seat assembly 200 includes one of a protrusion and an opening, and each corresponding upper handle coupler 154 of the carriage frame 100' includes another of a protrusion and an opening that is configured to engage the one of the protrusion and the opening so as to couple the upper handle coupler 250 to one of the first and second handle portions 104*a* and 104*b*.

The upper handle couplers 154 is rigidly attached to the carriage frame 100' such that movement of the first and second handle portions 104*a* and 104*b* causes a corresponding movement of the upper handle couplers 154. Further, the upper handle couplers 250 of the soft goods seating assembly 200 is configured to rigidly attach to the handle couplers 154 such that movement of the first and second handle portions 104*a* and 104*b* causes a corresponding movement of the handle couplers 250 of the soft goods seating assembly 200.

The upper handle couplers 250 is fixedly attached to the soft goods seat 201. For example, the upper handle couplers 250 is attached to the soft goods seat 201 by sewing or by a rivet, screw; or another suitable fastener. Each upper handle coupler 250 is configured to removably couple a side 201*a*, 201*b* of the soft goods seat 201 to one of the first and second handle portions 104*a* and 104*b*. For example, the pair of upper handle couplers 250 is configured to removably couple the first and second sides 201*a*, 201*b* of the soft goods seat 201 to the first and second handle portions 104*a* and 104*b*, respectively. The upper handle couplers 250 is spaced from one another along the lateral direction A. For instance, the upper handle couplers 250 is disposed at first and second sides 201*a* and 201*b* of the soft goods seat 201.

FIGS. 31 and 32 show one example of an upper handle coupler 154 of the carriage frame 100'. The upper handle coupler 154 defines a recess 154*a* therein that is configured to receive at least a portion of a corresponding one of the upper handle couplers 250. The recess 154*a* has an upper end 154*b* and a lower end 154*c* that are offset from one another along a select direction $D_{S3}$. The upper end 154*b* is open such that the upper handle fastener 250) is removed therefrom along an upwards direction. The lower end 154*c* defines a stop that prevents the upper handle fastener 250 from being removed along a downwards direction. The recess 154*a* is elongate from the upper end 154*b* to the lower end 154*c*. The recess 154*a* defines an opening 154*d* at an outer surface of the upper handle coupler 154. The opening 154*d* extends between the upper and lower ends 154*b* and 154*c*. The opening 154*d* is narrowed in relation to an inner portion of the recess 154*a*. For example, the opening 154*d* can have a cross-sectional dimension in a direction that is perpendicular to the select direction $D_{S3}$, the cross-sectional dimension being less than a cross-sectional dimension of an inner portion of the recess 154*a*. The recess 154*a* can have a dovetail shape or any other suitable shape such as a triangular shape or a T-shape with a narrowed opening 154*d*.

Turning to FIG. 33, the upper handle coupler 250 can have a body 250*a* having at least a portion 250*b* thereof that has a thickness that is sewn to the soft goods seat 201. The body 250*a* can have a planar shape. The upper handle coupler 250 includes a protrusion 250*c* that extends from the body 250*a*. The protrusion 250*c* can have a first end 250*d* and a second end 250*e* that are offset from one another along the select direction $D_{S3}$. The protrusion 250*c* is elongate from the first end 250*d* to the second end 250*e*. The protrusion 250*c* can have outer portion 250*f* that is enlarged. The outer portion 250*f* extends between the first and second ends 250*d* and 250*e*. The protrusion 250*c* can have an inner portion 250*g* attached to the body 250. The inner portion 250*g* is narrowed relative to the outer portion 250*f*. For example, the outer portion 250*f* can have a cross-sectional dimension in a direction that is perpendicular to the select direction $D_{S3}$, the cross-sectional dimension being greater than a cross-sectional dimension of the inner portion 250*g*. The protrusion 250*c* can have a dovetail shape or any other suitable shape such as a triangular shape or a T-shape with an enlarged outer portion 250*f*. The protrusion 250*c* of the upper handle coupler 250 is configured to mate with the recess 154*a* of the upper handle coupler 154*a* so as to prevent the protrusion 250*c* from being removed from the recess 154*a* along an outward direction. For example, the cross-sectional dimension of the enlarged outer portion 150*f* of the protrusion 250*c* is greater than the cross-sectional dimension of the opening 154*d* of the recess 154*a*. It will be understood that, in alternative examples, the upper handle coupler 154 includes the protrusion 250*c* and the upper handle coupler 250) defines the recess 154*d*.

The soft goods seat assembly 200 is configured such that each sidewall 206(1), 206(2) is installed by (1) attaching a corresponding one of the upper handle couplers 250 to a corresponding one of the first and second handle portions 104*a*, 104*b*, (2) pulling the sidewall 206(1), 206(2) down so as to apply tension to the sidewall 206(1), 206(2), and (3) attaching a corresponding one of the lower sidewall couplers 228(1), 228(2) to a corresponding one of the first and second handle portions 104*a*, 104*b* below a corresponding one of the stops 130(1), 130(2) while the sidewall 206(1), 206(2) is tensioned so as to maintain tension in the sidewall 206(1), 206(2). The tension in the sidewall 206(1), 206(2) can maintain the sidewall 206(1), 206(2) in tight relation with the one of the first and second handle portions 104a, 104b. In some examples, the soft goods seat assembly 200 is configured such that each sidewall 206(1), 206(2) cannot be installed by attaching a corresponding one of the upper handle couplers 250 to a corresponding one of the first and second handle portions 104a, 104b after attaching a corresponding one of the lower sidewall couplers 228(1), 228(2) to a corresponding one of the first and second handle portions 104a, 104b below a corresponding one of the stops 130(1), 130(2).

Referring back to FIGS. 31 and 32, each upper handle coupler 154 includes a first side 154a and a second side 154b. The first side 154a is configured to attach to one of the first and second handle portions 104a, 104b. For example, the first side 154a is configured to be attached to one of the first and second handle portions 104a, 104b by rivet, screw, or other suitable fastener. The first side 154a can have a shape, such as a curved shape, that conforms to a shape of the one of the first and second handle portions 104a, 104b. In some examples, the second side 154b of each upper handle coupler 154 is configured to removably couple the caregiver organizer 600' to the handle 104. For example, each upper handle coupler 154 includes a fastener 156 that is configured to removably couple to an end of the caregiver organizer 600'. The fastener 156 is any suitable fastener. FIGS. 31 and 32 show one example in which the fastener 156 comprises a protrusion having a "T" shape that is configured to mate with a "T" shaped recess in an end of the of the caregiver organizer 600'.

Figure 34:
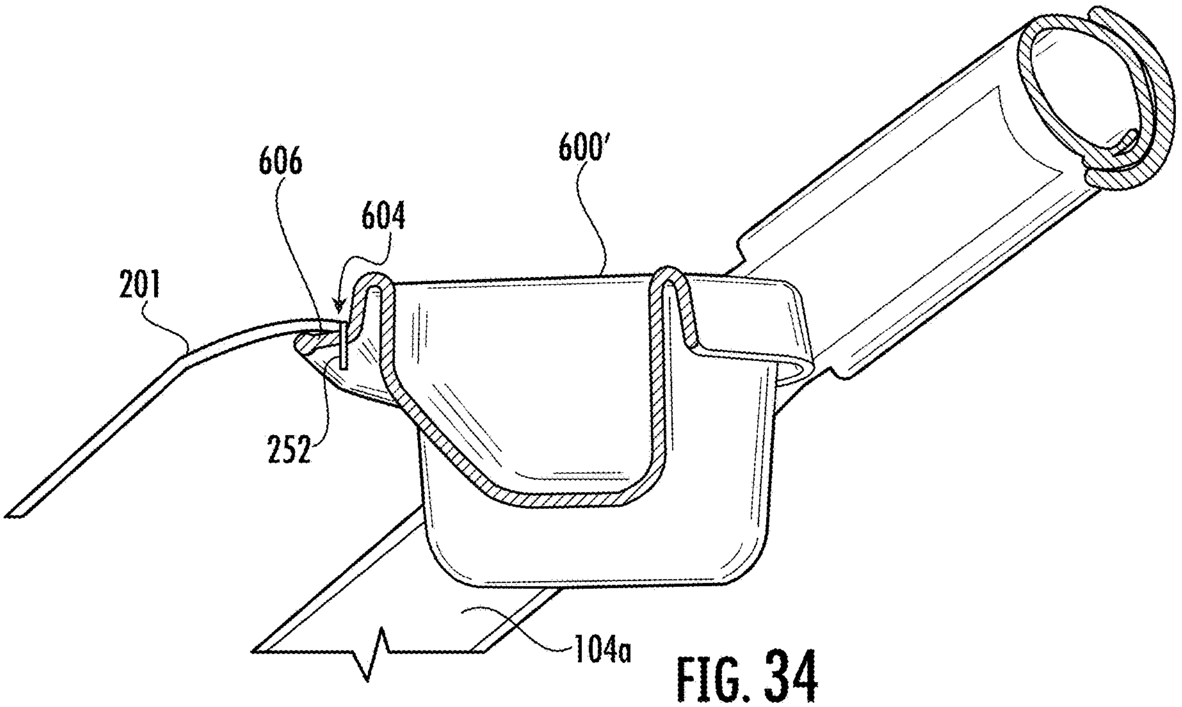
FIG. 34 shows a cross-sectional view of a portion of the handle and caregiver organizer of the carriage frame of FIG. 24.

Turning to FIG. 34, in some examples, the upper end of the soft goods seat 201 is configured to coupler to the caregiver organizer 600' between the first and second handle portions 104a, 104b. For example, the caregiver organizer 600' includes an opening 604 (labeled in FIGS. 29 and 34), and the upper end of the soft goods seat 201 includes a tab or anchor 252 that is configured to be received in the opening 604. The caregiver organizer 600' includes a ledge 606 adjacent the opening 604. The upper end of the soft goods seat 201 can lay along the ledge 606 such that the ledge 606 gives shape to the upper end of the soft goods seat 201.

It should be noted that the illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain examples have been described, these examples are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms: furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The words "inward," "outward," "upper," and "lower" refer to directions toward or away from, respectively, the geometric center of the carriage and its components.

It will be understood that reference herein to "a" or "one" to describe a feature such as a component or step does not foreclose additional features or multiples of the feature. For instance, reference to a device having, comprising, including, or defining "one" of a feature does not preclude the device from having, comprising, including, or defining more than one of the feature, as long as the device has, comprises, includes, or defines at least one of the feature. Similarly, reference herein to "one of" a plurality of features does not foreclose the invention from including two or more of the features. For instance, reference to a device having, comprising, including, or defining "one of a protrusion and a recess" does not foreclose the device from having both the protrusion and the recess.

What is claimed is:

1. A child carriage, comprising:

a carriage frame configured to support a removable child seat above a riding surface, the carriage frame having:

a lower frame portion comprising at least one front leg, a first rear leg, and a second rear leg; and a soft goods seat assembly that is configured to removably couple to the frame, the soft goods seat assembly comprising:

a soft goods seat having a seatback and a seat pan that extends from the seatback at a seat bight; and a first leg coupler and a second leg coupler disposed at first and second sides of the soft goods seat, respectively, the first leg coupler and the second leg coupler further disposed adjacent the seat bight, and configured to removably attach to the first and second rear legs, respectively, so as to couple the seat bight to the first and second rear legs and such that the first and second leg couplers are positionally fixed relative to the first and second rear legs, respectively.

2. The child carriage of claim 1, wherein the soft goods seat assembly comprises at least one support strap that is attached to the soft goods seat adjacent to the seat bight, each support strap coupled to the first and second leg couplers.

3. The child carriage of claim 2, wherein each support strap has a fixed length between the first and second leg couplers.

4. The child carriage of claim 2, wherein the soft goods seat assembly comprises a support strap attached to the soft goods seat along the seat pan adjacent to the seat bight so as to provide structural support to the seat pan.

5. The child carriage of claim 4, wherein the soft goods seat assembly comprises a support strap attached to the soft goods seat along the seatback adjacent to the seat bight so as to provide structural support to the seatback.

6. The child carriage of claim 1, wherein the first and second leg couplers are configured to be removed from the first and second rear legs, respectively, by a user without using a removal tool.

7. The child carriage of claim 1, comprising a seat bight coupler attached to each of the first and second rear legs that is configured to releasably couple to one of the first and second leg couplers of the soft goods seat assembly.

8. The child carriage of claim 7, wherein the seat bight coupler of each of the first and second rear legs comprises a first portion and a second portion that are spaced from one another so as to define a space therebetween that receives a corresponding one of the first and second leg couplers of the soft goods seat assembly.

9. The child carriage of claim 8, wherein the first portion comprises one of a protrusion and an opening that is configured to engage another of a protrusion and an opening of a corresponding one of the first and second leg couplers of the soft goods seat assembly.

10. The child carriage of claim 9, wherein the second portion comprises one of a protrusion and an opening that is configured to engage another of a protrusion and an opening of a corresponding one of the first and second leg couplers of the soft goods seat assembly.

11. The child carriage of claim 10, wherein at least one of the protrusions is movable between a retracted position and an extended position.

12. A child carriage, comprising:

a carriage frame configured to support a removable child seat above a riding surface, the carriage frame having:

a lower frame portion comprising a plurality of legs;

at least one frame coupler comprising a first portion and a second portion that are spaced from one another so as to define a space therebetween; and a soft goods seat assembly that is configured to removably couple to the frame, the soft goods seat assembly comprising:

a soft goods seat having a seatback and a seat pan that extends from the seatback; and at least one seat coupler configured to removably couple to the at least one frame coupler of the carriage frame, the at least one seat coupler being at least partially positioned in the space between the first and second portions, wherein the first portion comprises an opening that is configured to engage a protrusion of the at least one seat coupler of the soft goods seat assembly, and the second portion comprises a protrusion that is configured to engage an opening of the at least one seat coupler of the soft goods seat assembly; and wherein the at least one seat coupler of the soft goods seat assembly comprises a housing and a shuttle that is supported by the housing and carries a protrusion, the shuttle being movable so as to move the protrusion relative to the housing between a retracted position and an extended position.

13. The child carriage of claim 12, wherein at least one of the protrusions is movable between a retracted position and an extended position.

14. The child carriage of claim 12, wherein the plurality of legs comprises at least one rear leg, and the at least one frame coupler of the carriage frame is attached to the at least one rear leg.

15. The child carriage of claim 12, wherein the at least one coupler of the soft goods seat assembly is configured to removably couple to the at least one frame coupler of the carriage frame such that the at least one seat coupler of the soft goods seat assembly and the at least one frame coupler of the frame are rigidly attached to the carriage frame.

16. A child carriage, comprising:

a carriage frame configured to support a removable soft goods seat assembly above a riding surface, the carriage frame having:

a lower frame portion comprising a plurality of legs; and a handle having a first handle portion and a second handle portion that extend away from the lower frame portion and that are spaced from one another so as to define a space therebetween; and a soft goods seat assembly that is configured to removably couple to the frame, and fit within the defined space, the soft goods seat assembly comprising:

a soft goods seat having a seatback, a seat pan that extends forward from the seatback, and first and second sidewalls that extend forward from the seatback;

an upper coupler configured to removably couple the first sidewall to the first handle portion; and a lower coupler configured to removably couple the first sidewall to the first handle portion, wherein the child carriage is configured such that the first sidewall can be attached to the first handle portion by coupling the upper handle coupler to the first handle portion and then coupling the lower coupler to the first handle portion; and wherein the carriage frame comprises a stop attached to the first handle portion, the lower coupler is configured to be coupled to the first sidewall below the stop such that the stop provides an interference that prevents the lower coupler from translating upwards along the first handle portion, and the first sidewall is in tension when the upper coupler is coupled to the first handle portion and lower coupler is coupled to the first handle portion against a lower end of the stop.

17. The child carriage of claim 16, wherein the upper coupler is configured to removably couple to the upper coupler of the soft goods seat assembly.

18. The child carriage of claim 17, wherein:

the upper coupler of the carriage frame comprises a protrusion having a neck and a head; and the upper coupler of the soft goods seat assembly defines an opening having a first portion, and a second portion that is spaced from the first portion along a downward direction, the first portion having a cross-sectional dimension that is less than a cross-sectional dimension of the second portion, wherein the first portion is configured to receive the head therethrough, and the upper coupler of the soft goods seat assembly is configured to translate along the neck such that the neck is received in the second portion and the upper coupler of the soft goods seat assembly is trapped between the head and the first handle portion.

19. A child carriage, comprising:

a carriage frame configured to support a removable soft goods seat assembly above a riding surface, the carriage frame having:

a lower frame portion comprising a plurality of legs; and a handle having a first handle portion and a second handle portion that extend upwards from the lower frame portion and that are spaced from one another so as to define a space therebetween for the soft goods seat assembly; and a soft goods seat assembly that is configured to removably couple to the frame, the soft goods seat assembly comprising:

a soft goods seat having a seatback, a seat pan that extends forward from the seatback, and first and second sidewalls that extend forward from the seatback;

a canopy having a bow; and a coupler that is configured to couple both the first sidewall and the bow to the first handle portion.

20. The child carriage of claim 19, wherein the coupler has a body that defines a recess that is configured to receive the first handle portion so as to couple to the first handle portion.

21. The child carriage of claim 19, wherein the coupler is fixedly attached to the first sidewall such that removal of the coupler from the first handle portion causes removal of at least a portion first sidewall from the first handle portion.

22. The child carriage of claim 19, wherein the joint has a first portion that is monolithic with the body of the coupler, and a second portion that is configured to rotate relative to the first portion so as to rotate the bow.

* * * * *